(12) United States Patent
Adkins et al.

(10) Patent No.: US 7,528,574 B1
(45) Date of Patent: May 5, 2009

(54) SYSTEMS AND METHODS OF PROGRAMMING VOLTAGE AND CURRENT IN A BATTERY CHARGER

(75) Inventors: Kenneth C Adkins, Mason, OH (US); M Abid Hussain, Sunnyvale, CA (US)

(73) Assignee: Summit Microelectronics, Inc., Sunnyvale, CA (US)

( * ) Notice: Subject to any disclaimer, the term of this patent is extended or adjusted under 35 U.S.C. 154(b) by 505 days.

(21) Appl. No.: 11/357,259

(22) Filed: Feb. 16, 2006

(51) Int. Cl.
*H01M 10/44* (2006.01)
*H01M 10/46* (2006.01)
(52) U.S. Cl. .................................. 320/128
(58) Field of Classification Search ........... 320/106, 320/114, 115, 128, 132, 161
See application file for complete search history.

(56) References Cited

U.S. PATENT DOCUMENTS

| | | | |
|---|---|---|---|
| 5,483,390 A * | 1/1996 | Jaffard et al. ............ | 360/62 |
| 5,534,765 A | 7/1996 | Kreisinger et al. | |
| 5,554,921 A | 9/1996 | Li et al. | |
| 5,986,437 A | 11/1999 | Lee | |
| 6,185,127 B1 | 2/2001 | Myers et al. | |
| 6,297,617 B1 | 10/2001 | Aoyama | |
| 6,351,110 B1 | 2/2002 | Pappalardo et al. | |
| 6,353,305 B1 | 3/2002 | Cannon et al. | |
| 6,366,056 B1 | 4/2002 | Podrazhansky et al. | |
| 6,369,561 B1 | 4/2002 | Pappalardo et al. | |
| 6,400,124 B1 | 6/2002 | Hidata et al. | |
| 6,404,169 B1 | 6/2002 | Wong | |
| 6,420,853 B1 | 7/2002 | Harada et al. | |
| 6,433,517 B2 | 8/2002 | Sakakibara | |
| 6,437,549 B1 | 8/2002 | Takagishi | |
| 6,456,035 B1 | 9/2002 | Crisp et al. | |
| 6,459,237 B1 | 10/2002 | Bausch | |
| 6,476,584 B2 | 11/2002 | Sakakibara | |
| 6,498,461 B1 | 12/2002 | Bucur | |
| 6,507,172 B2 | 1/2003 | Sherman | |
| 6,518,726 B1 | 2/2003 | Nowlin, Jr. et al. | |
| 6,580,249 B2 | 6/2003 | Yau et al. | |
| 6,586,917 B1 | 7/2003 | Smith | |
| 6,605,926 B2 | 8/2003 | Crisp et al. | |
| 6,611,129 B2 | 8/2003 | Bucur | |
| 6,617,827 B2 | 9/2003 | Numanami et al. | |
| 6,630,812 B1 | 10/2003 | Davis | |
| 6,664,765 B2 | 12/2003 | Dotzler et al. | |
| 6,791,297 B2 | 9/2004 | Ott et al. | |
| 6,791,300 B2 | 9/2004 | Trinh et al. | |
| 6,791,879 B1 | 9/2004 | Adkins | |

(Continued)

OTHER PUBLICATIONS

Microchip Technology Inc., "PS2070 PS200 Switch Mode Charger Evaluation Board", data sheet, 2005.

(Continued)

*Primary Examiner*—Edward Tso
(74) *Attorney, Agent, or Firm*—Chad R. Walsh; Fountainhead Law Group P.C.

(57) ABSTRACT

In one embodiment the present invention includes a method of charging a battery comprising storing a plurality of charging parameters in one or more programmable data storage elements. The charging parameters may be used to program a variety of battery charging parameters including constant currents, voltages, thresholds, timers, or temperature controls. In one embodiment, the present invention includes a software algorithm that changes the charging parameters to improve battery charging efficiency.

55 Claims, 11 Drawing Sheets

U.S. PATENT DOCUMENTS

| | | |
|---|---|---|
| 6,794,851 B2 | 9/2004 | Murakami et al. |
| 6,822,423 B2 | 11/2004 | Yau et al. |
| 6,833,685 B2 | 12/2004 | Howard et al. |
| 6,844,705 B2 | 1/2005 | Lai et al. |
| 6,859,016 B2 | 2/2005 | Dotzler |
| 6,917,184 B2 | 7/2005 | Lai et al. |
| 6,919,709 B2 | 7/2005 | Rouverand et al. |
| 7,002,266 B1 | 2/2006 | Adkins et al. |
| 2003/0030412 A1 | 2/2003 | Matsuda et al. |
| 2003/0111980 A1 | 6/2003 | Lee |
| 2004/0189251 A1 | 9/2004 | Kutkut et al. |
| 2005/0083016 A1 | 4/2005 | Yau et al. |
| 2005/0134220 A1 | 6/2005 | Brohlin et al. |
| 2005/0275381 A1 | 12/2005 | Guang et al. |

OTHER PUBLICATIONS

Texas Instruments, "Single-Chip, Li-Ion and Li-Pol Charger IC with Autonomous USB-Port and AC-Adapter Supply Management (bqTINY-II)", data sheet, Aug. 2004.

Linear Technology, "LTC4002 Standalone Li-Ion Switch Mode Battery Charger", data sheet, 2003.

Linear Technology, "LTC 4055 USB Power Controller and Li-Ion Linear Charger", data sheet, 2004.

Linear Technology, "LTC4057-4.2 Linear Li-Ion Battery Charger with Thermal Regulation in ThinSOT", data sheet, 2003.

Texas Instruments, "Synchronous Switchmode, Li-Ion and Li-Pol Charge Management IC with Integrated Powerfets (bqSWITCHER)", data sheet, Nov. 2004.

Maxim, "SOT23 Dual-Input USB/AC Adapter 1-Cell Li+ Battery Chargers", data sheet, Jul. 2003.

Intersil, "ISL6293 Li-ion/Li Polymer Battery Charger Accepting Two Power Sources", data sheet, Jan. 4, 2006.

National Semiconductor, "LP3947 USB/AC Adaptor, Single Cell Li-Ion Battery Charger IC", data sheet, Nov. 2004.

Office Action from a corresponding foreign application, Issued by the Korean Intellectual Property Office (KIPO) on Nov. 12, 2008, Korean Appln No. 2007-1550.

* cited by examiner

SYSTEMS AND METHODS OF PROGRAMMING VOLTAGE AND CURRENT IN A BATTERY CHARGER

BACKGROUND

The present invention relates to battery chargers, and in particular, to programmable battery charging systems and methods.

Batteries have long been used as a source of power for mobile electronic devices. Batteries provide energy in the form of electric currents and voltages that allow circuits to operate. However, the amount of energy stored in a battery is limited, and batteries lose power when the electronic devices are in use. When a battery's energy supply becomes depleted, the battery's voltage will start to fall from its rated voltage, and the electronic device relying on the battery for power will no longer operate properly. Such thresholds will be different for different types of electronic devices.

Many types of batteries are designed for a single use. Such batteries are discarded after the charge is depleted. However, some batteries are designed to be rechargeable. Rechargeable batteries typically require some form of battery charging system. Typical battery charging systems transfer power from a power source, such as an AC wall plug, into the battery. The recharging process typically includes processing and conditioning voltages and currents from the power source so that the voltages and currents supplied to the battery meet the particular battery's charging specifications. For example, if the voltages or currents supplied to the battery are too large, the battery can be damaged or even explode. On the other hand, if the voltages or currents supplied to the battery are too small, the charging process can be very inefficient or altogether ineffective. Inefficient use of the battery's charging specification can lead to very long charging times, for example. Additionally, if the charging process is not carried out efficiently, the battery's cell capacity (i.e., the amount of energy the battery can hold) may not be optimized. Moreover, inefficient charging can impact the battery's useful lifetime (i.e., number of charge/discharge cycles available from a particular battery). Furthermore, inefficient charging can result from the battery's characteristics changing over time. These problems are compounded by the fact that battery characteristics, including a battery's specified voltages and recharge currents, can be different from battery to battery.

Existing battery charges are typically static systems. The charger is configured to receive power from a particular source and provide voltages and currents to a particular battery based on the battery's charge specification. However, the inflexibility of existing chargers results in many of the inefficiencies and problems described above. It would be very advantageous to have battery charging systems and methods that were more flexible than existing systems or even adaptable to particular batteries or the changing battery charging environment. Thus, there is a need for improved battery charger systems and methods that improve the efficiency of the battery charging process. The present invention solves these and other problems by providing programmable battery charging system and methods.

SUMMARY

Embodiments of the present invention improve battery charging. In one embodiment the present invention includes a method of charging a battery comprising storing a plurality of charging parameters in one or more programmable data storage elements. The charging parameters may be used to program a variety of battery charging parameters including constant currents, voltages, thresholds, timers, or temperature controls. In one embodiment, the present invention includes a software algorithm that changes the charging parameters to improve battery charging efficiency.

In one embodiment the present invention includes a method of charging a battery comprising storing a plurality of charging parameters in one or more programmable data storage elements, supplying a constant current to said battery during a first time period, wherein the constant current supplied is set by a first parameter of said stored charging parameters and the first parameter is variable across a range of values to program the constant current across a corresponding range of current values, and generating a constant voltage to said battery during a second time period following the first time period if a voltage on the battery is above a first threshold, wherein the constant voltage is set by a second parameter of said stored charging parameters and the second parameter is variable across a range of values to program the constant voltage across a corresponding range of voltage values.

In one embodiment, the range of second charging parameter values includes at least a highest value, a lowest value, and a plurality of intermediate values between the highest and lowest values, and wherein said constant voltages is programmed to the highest value, the lowest value, or any intermediate value by the second charging parameter in one of the programmable data storage elements.

In one embodiment, the range of first charging parameter values includes at least a highest value, a lowest value, and a plurality of intermediate values between the highest and lowest values, and wherein said constant current is programmed to the highest value, the lowest value, or any intermediate value by the first charging parameter in one of the programmable data storage elements.

In one embodiment, the supplying a constant current comprises supplying a first constant precharge current to said battery if a voltage on said battery is below a second threshold, and supplying a second constant current to said battery if a voltage on said battery is above the second threshold, wherein the first constant precharge current and the second constant current are set by parameters stored in at least one of the programmable data storage elements.

In one embodiment, the second threshold is set by a parameter stored in at least one of the programmable data storage elements.

In one embodiment, the method further comprises reprogramming one or more of charging parameters stored in the data storage elements.

In one embodiment, the charging parameters are reprogrammed while the battery is charging.

In one embodiment, the constant current is reprogrammed to a plurality of different values during the first time period.

In one embodiment, one or more charging parameters are reprogrammed in accordance with a predefined software algorithm.

In one embodiment, the algorithm changes one or more charging parameters while the battery is charging.

In one embodiment, the algorithm changes one or more charging parameters over multiple charging cycles.

In one embodiment, the algorithm changes the constant current based on a sensed reprograms one or more of the data storage elements, and in accordance therewith, changes a corresponding one or more charging parameters.

In one embodiment, the algorithm is stored in nonvolatile memory.

In one embodiment, the data storage element is a volatile storage device.

In one embodiment, the data storage element is a nonvolatile storage device.

In one embodiment, the plurality of charging parameters are stored in the nonvolatile storage device and transferred to a volatile storage device.

In one embodiment, the battery is charged using a linear regulator.

In one embodiment, the battery is charged using a switching regulator.

In one embodiment, the switching regulator switches at a first frequency, and wherein the first frequency is set by a parameter stored in one of the programmable data storage elements.

In one embodiment, the method further comprises measuring a time the first constant precharge current is supplied to the battery and terminating the first constant precharge current if a voltage on said battery is below the second threshold after a predetermined time period, wherein the predetermined time period is set by a parameter stored in one of the programmable data storage elements.

In one embodiment, the method further comprises measuring a time the second constant current is supplied to the battery and terminating the second constant current if a voltage on said battery is below the first threshold after a predetermined time period, wherein the predetermined time period is set by a parameter stored in one of the programmable data storage elements.

In one embodiment, the method further comprises third and fourth stored parameters, wherein the third parameter is used to program an over-temperature limit and the fourth parameter is used to program an under-temperature limit, and wherein if the temperature of the battery is above the over-temperature limit or below the under-temperature limit, then charging is suspended.

In one embodiment, the method further comprises a fifth stored parameter, wherein the fifth parameter is used to program a bias current into a battery temperature sensor. In one embodiment, the battery temperature sensor is an external negative temperature coefficient thermistor.

In one embodiment, the constant current comprises a first constant precharge current, and the first constant precharge current is set by a first charging parameter stored as a plurality of digital bits.

In one embodiment, the constant current further comprises a second constant current greater than the first constant precharge current, and the second constant current is set by a second charging parameter stored as a plurality of digital bits.

In one embodiment, the method further comprises a second threshold for selecting between the first constant precharge current and the second constant current, wherein the second threshold is set by a third charging parameter stored as a plurality of digital bits.

In one embodiment, the second parameter corresponding to the constant voltage is stored as a plurality of digital bits.

In one embodiment, the plurality of charging parameters are each stored as a plurality digital bits, and each charging parameter is separately programmable.

In one embodiment, the digital bits corresponding to the plurality of charging parameters are converted to an analog parameter.

In one embodiment, the analog parameter is an analog voltage or current.

In one embodiment, the digital bits are converted to an analog parameter using a digital-to-analog converter.

In one embodiment, the digital bits are converted to an analog parameter by controlling the selection of one of a plurality of outputs of a voltage divider, wherein each output has a different voltage.

In one embodiment, the data storage elements are programmed using a digital bus. In one embodiment, the digital bus comprises a serial bus. In another embodiment, the digital bus comprises a parallel bus.

In one embodiment, the said battery comprises one or more lithium ion batteries, one or more nickel metal hybride batteries, or one or more nickel cadmium batteries.

In one embodiment, the charging parameters change a constant precharge current, a precharge threshold, a constant charge current greater than the constant precharge current, a float voltage, a constant current-to-constant voltage threshold, a termination current threshold, a precharge timeout, a fast charge timeout, an over-temperature limit, an under-temperature limit, a negative temperature coefficient thermistor bias current, or a switching regulator frequency across a range of values.

In another embodiment, the present invention includes a programmable battery charger comprising a regulator having a first input to receive a first power source, a first output to provide a regulated output to at least one battery, and a control input; a constant current controller having a first input coupled to a first programmable data storage element, a feedback input coupled to at least one current sense input, and an output coupled to the control input of the regulator, wherein the first programmable data storage element configures the constant current controller to supply a first programmed constant current to said battery if a voltage on said battery is below a first threshold; and a constant voltage controller having a first input coupled to a second programmable data storage element, a second input coupled to at least one voltage sense input, and an output coupled to the control input of the regulator, wherein the second programmable data storage element configures the constant voltage controller to generate one of a plurality of programmed constant voltages to said battery if the voltage on said battery is above the first threshold, wherein the programmed constant voltages are variable across a range of values.

In one embodiment, the range of voltage values includes at least a highest value, a lowest value, and a plurality of intermediate values between the highest and lowest values, and wherein said constant voltage is programmed to the highest value, the lowest value, or any intermediate value by the second programmable data storage element.

In one embodiment, the charger further comprises a programmable data storage element coupled to the constant current controller, wherein the data storage element configures the constant current controller to supply a second programmed precharge current to said battery if a voltage on said batter is below second precharge threshold, and wherein the precharge current is less than the first programmed constant current.

In one embodiment, the charger further comprises another programmable data storage element coupled to the constant current controller, wherein the programmable data storage element sets the second precharge threshold.

In one embodiment, the battery charger further comprises a multiplexer having a first input coupled to the first programmable data storage element, a second input coupled to a programmable data storage element, a control input coupled to a programmable data storage element, and an output coupled to the constant current controller.

In one embodiment, the battery charger further comprises a comparator having a first input coupled to a reference voltage, a second input coupled to a programmable data storage element, and an output coupled to the control input of the multiplexer.

In one embodiment, the battery charger further comprises a digital-to-analog converter having a first input coupled to the first programmable data storage element and an analog output coupled to the constant current controller.

In one embodiment, the battery charger further comprises a digital-to-analog converter having a first input coupled to the two programmable data storage elements, and an analog output coupled to the constant current controller.

In one embodiment, the battery charger further comprises a digital-to-analog converter having a first input coupled to the second programmable data storage element and an analog output coupled to the constant voltage controller.

In one embodiment, the battery charger further comprises a programmable data storage element coupled to a shutdown circuit, wherein the programmable data storage element is used to terminate battery charging if a current into said battery is below a programmed termination current threshold.

In one embodiment, the battery charger further comprises a digital-to-analog converter having a first input coupled to a programmable data storage element and an analog output coupled to the shutdown circuit.

In one embodiment, the battery charger further comprises a comparator having a first input coupled to at least one current sense terminal, a second input coupled to a programmable data storage element, and an output coupled to the shutdown circuit.

In one embodiment, a programmable data storage element is used to program an over-temperature limit and a programmable data storage element is used to program an under-temperature limit, and wherein if the temperature of the battery is above the over-temperature limit or below the under-temperature limit, then charging is suspended.

In one embodiment, a programmable data storage element is used to program a bias current into a battery temperature sensor. In one embodiment, the battery temperature sensor is an external negative temperature coefficient thermistor.

In one embodiment, the regulator is a switching regulator, and a programmable data storage element is used to program the switching frequency of the switching regulator.

In one embodiment, a plurality of programmable data storage elements store a corresponding plurality of charging parameters, wherein the charging parameters change a constant precharge current, a precharge threshold, a constant charge current greater than the constant precharge current, a float voltage, a constant current-to-constant voltage threshold, a termination current threshold, a precharge timeout, a fast charge timeout, an over-temperature limit, an under-temperature limit, a negative temperature coefficient thermistor bias current, or a switching regulator frequency across a range of values.

In one embodiment, a controller is coupled to the first and second programmable data storage elements to reprogram the first and second programmable data storage elements.

In one embodiment, a system processor is coupled to the first and second programmable data storage elements, wherein the system processor includes a software algorithm for controlling the reprogramming of the first and second programmable data storage elements.

In another embodiment, the present invention includes a method of charging a battery comprising programming one or more storage elements with one or more digital charging parameters, converting the digital charging parameters to analog parameters to control one or more analog circuits, controlling a battery charge cycle using the analog parameters, and changing the digital charging parameters under control of software.

In one embodiment, the digital charging parameters are changed during a charge cycle according to a software algorithm.

In one embodiment, the method further comprises sensing a current into the battery or a battery voltage, and in accordance therewith, changing the digital charging parameters.

In one embodiment, a digital charging parameter corresponds to a float voltage, and the float voltage is programmable across a range of values for use with different batteries having different battery voltage ratings.

In one embodiment, the digital charging parameters correspond to a plurality of constant currents, and wherein each constant current is programmable across a range of values.

In one embodiment, a digital charging parameter corresponds to a precharge threshold, and wherein the precharge threshold is programmable across a range of values.

The following detailed description and accompanying drawings provide a better understanding of the nature and advantages of the present invention.

DETAILED DESCRIPTION

Described herein are techniques for programmable battery charging systems and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
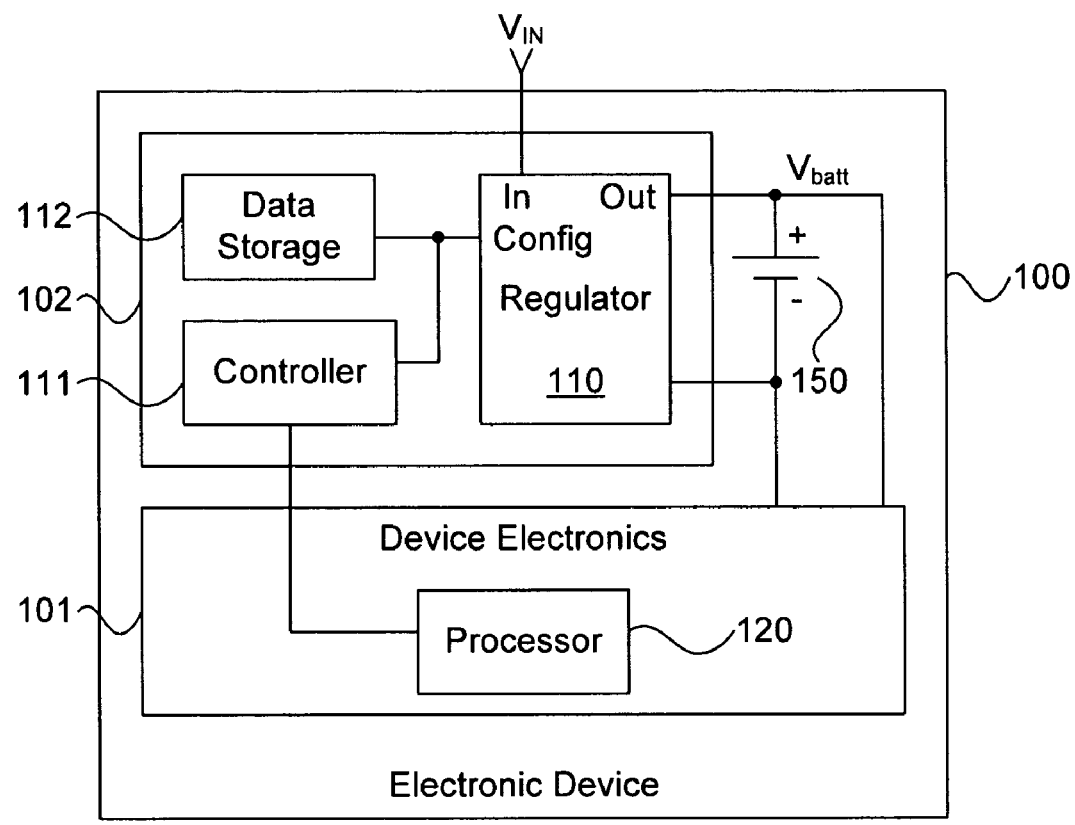
FIG. 1 illustrates an electronic device including a battery charger according to one embodiment of the present invention.

FIG. 1 illustrates an electronic device including a battery charger according to one embodiment of the present invention. An electronic device 100 includes device electronics 101 powered by a battery 150. The battery may be recharged using battery charger 102. Battery charger 102 is a programmable battery charger. Charger 102 includes a regulator 110 having a first input coupled to receive a first power source (e.g., an input voltage Vin) and a first output to provide a regulated output to at least one battery. Regulator 110 may further include internal circuitry for sensing battery current and voltage. Regulator 110 may use such information for controlling the transfer of voltage and current from the power source to the battery terminal. Regulator 110 may be either a linear regulator or a switching regulator, for example.

Charger 102 further includes data storage 112 coupled to regulator 110 for configuring and controlling the regulator. Data storage 112 may store a plurality of charging parameters for controlling regulator 110 during the charging of battery 150. The parameters may be reprogrammed to change the voltages and/or currents or other parameters used to charge the battery, and thereby improve battery charging efficiency. The term "programmable" as used herein means changeable (or variable) in response to digital signals (e.g., received over a bus). Thus, the present invention is programmable without changing physical components, and is distinguishable from devices that have parameters that can only be changed by changing external resistors, for example. Data storage 112 may be either volatile or nonvolatile memory, for example, and the charging parameters may be reprogrammed across different charge cycles or during a single charge cycle (while the battery is charging). Charger 102 may also include a controller 111 coupled to data storage 112 and regulator 110. Controller 111 may be used to program data storage 112 with charging parameters. Alternatively, controller 111 may store charging parameters for configuring and controlling regulator 110 directly. The charging parameters in data storage 112 may be programmed through controller 111 using a digital bus (e.g., serial or parallel), for example. Accordingly, the charging parameters may be changed under control of software, for example, on the electronic device or on an external system such as a computer.

In one embodiment, the digital bus comprises an I²C bus or Universal Serial Bus ("USB").

In one embodiment, charging parameters may each be stored as a plurality digital bits, and different charging parameter may be programmed separately and/or independently. The digital bits corresponding to a plurality of charging parameters may then be converted to an analog parameter, such as a voltage or current. The analog parameter may, in turn, be coupled to a node in regulator 110 to modify the behavior of the regulator as desired, and accordingly, change the characteristics of charging. In one embodiment, the digital bits may be converted to an analog parameter using a digital-to-analog converter ("DAC") as described below.

In one embodiment, regulator 110 supplies a constant current to battery 150 during a first time period and generates a constant voltage to battery 150 during a second time period in the charging cycle. For example, when the battery voltage is below a certain threshold, the regulator may act as a current source into the battery. The system may then switch from constant current mode to constant voltage mode if a voltage on the battery increases above a threshold value. If the voltage on the battery rises to a particular level, the system may then maintain a constant voltage as the current tapers off. In one embodiment, the constant current and/or constant voltage supplied to battery 150 by regulator 110 may be set by stored charging parameters. Additionally, the constant current to constant voltage transition threshold may also be stored as a charging parameter.

In one embodiment, stored charging parameters may be variable across a range of values. Accordingly, charging characteristics such as constant current and/or constant voltage may be programmed across a corresponding range of current or voltage values, for example. In one embodiment, the range of charge parameter values includes at least a highest value, a lowest value, and a plurality of intermediate values between the highest and lowest values. Thus, the constant voltage or current may be programmed to the highest value, the lowest value, or any intermediate value by reprogramming the corresponding charging parameter in data storage 112. One example advantage of such programming is the ability to use one programmable charger for charging batteries with different voltage ratings and recharge current ratings.

Embodiments of the present invention further include reprogramming one or more charging parameters in accordance with a predefined software algorithm. Software for controlling the charging process may be written in advance and loaded on the electronic device to dynamically control the charging process. For example, electronic device 100 may include a processor 120, which may be a microprocessor or microcontroller, for example. Processor 120 may access charge control software in volatile or nonvolatile memory (e.g., data storage 112 or another memory included as part of electronic device 100) and may execute algorithms for reprogramming the charging parameters in data storage 112. The algorithm may change one or more charging parameters while the battery is charging, for example, or the algorithm may change one or more charging parameters over multiple charging cycles.

Embodiments of the invention may be used in a variety of electronic devices and for charging a variety of battery types and configurations. To illustrate the advantages of certain aspects of the present invention, an example will be described in the context of charging a lithium ion ("Li+") battery. However, it is to be understood that the following example is for illustrative purposes only, and that other types of batteries, such as lithium polymer batteries, nickel metal hydride batteries, or nickel cadmium batteries, for example, having different voltages and charge specifications could also be advantageously charged using the techniques described herein.

Figure 2:
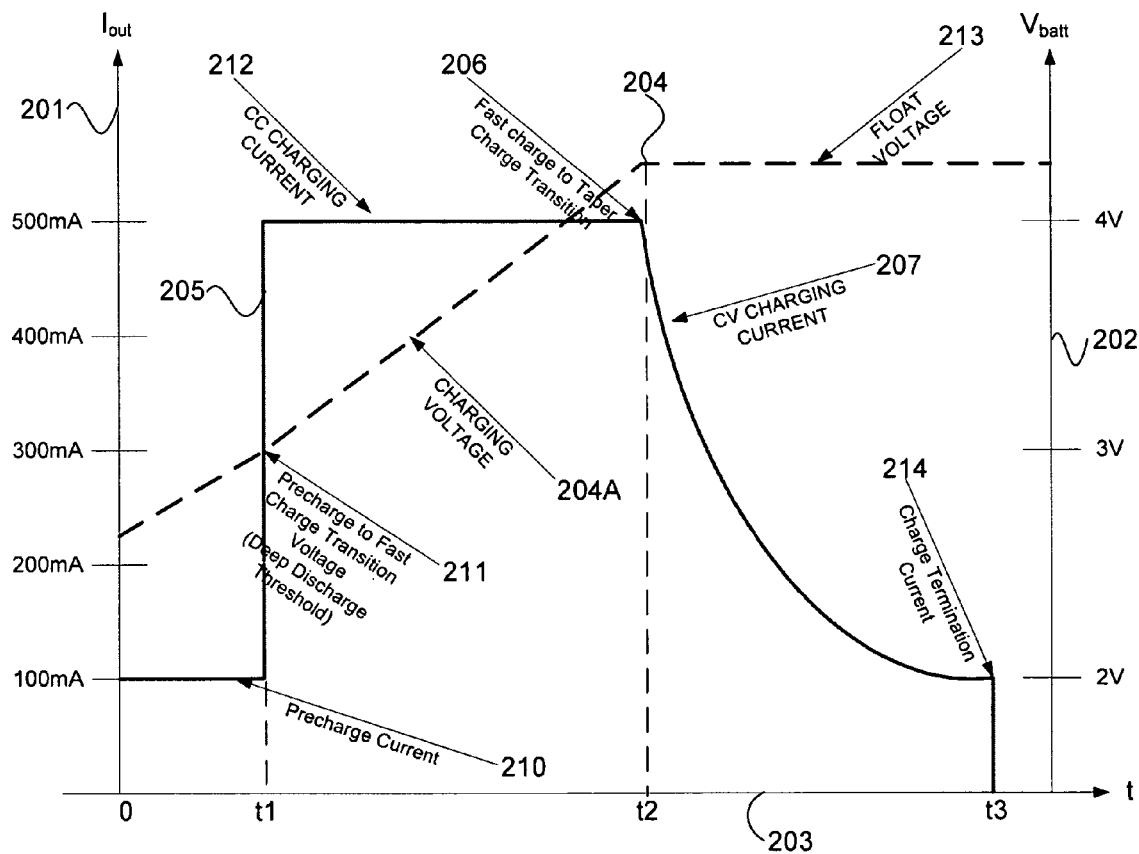
FIG. 2 is an example programmable charge cycle for a battery according to one embodiment of the present invention.

FIG. 2 is an example programmable charge cycle for a battery according to one embodiment of the present invention. The graph in FIG. 2 shows the current into the battery ("Iout") plotted on the left vertical axis 201 and the voltage on the battery ("Vbatt") on the right vertical axis 202 versus time ("t") on the horizontal axis 203. Voltage on the battery over time is shown by the dashed line 204, and current into the battery is shown by the solid line 205. This example illustrates a charge cycle for charging a deeply depleted Li+ battery. Embodiments of the present invention provide programmable control over one or more parameters of the charge cycle curve. The battery is charged in two basic modes: a constant current mode (t=0, t2) and a constant voltage mode (t=t2, t3), both of which may be programmable across a range of values. In this example, the voltage on the battery is initially below some particular threshold (e.g., 3 volts), indicating that the battery is deeply depleted. Accordingly, the constant current mode may initially generate a constant precharge current 210 (e.g., 100 mA), which may be set by a stored charging parameter so that the precharge current can be programmed across a range of values. The constant precharge current 210 will cause the battery voltage to start to increase. When the battery voltage increases above a precharge threshold 211, the system will increase the constant current into the battery (e.g., to 500 mA). In one embodiment, the precharge threshold 211 may also be programmed using a stored charging parameter. The system may detect the battery voltage, and if the voltage is below the precharge threshold 211, the system will generate a constant precharge current. When the battery voltage increases above the programmed value for the precharge threshold 211, the system will generate a constant current 212 greater than the precharge current. The second constant current is sometimes referred to as the "fast charge" current.

While the fast charge current is being delivered to the battery, the voltage on the battery will continue to increase as shown at A. Embodiments of the present invention also allow programming of the threshold at which the system changes from supplying a constant current to generating a constant voltage. For example, a charging parameter corresponding to the threshold at which the system makes the transition from constant current control to constant voltage control may be stored in memory. When the voltage on the battery increases above the programmed threshold, the system may automatically transition to provide a constant voltage 213 to the battery. In one embodiment, the voltage 213 supplied to the battery (i.e., the "float" voltage) is set by a stored charging parameter. The float voltage may be set to any number of voltages in a range of voltage values by programming the corresponding stored charging parameter. When the battery increases to the float voltage during constant current mode, the system will transition into constant voltage mode and maintain the float voltage 213 at the battery. While the system is in constant voltage mode, the current 207 into the battery will begin to decrease (i.e., "taper" or "fall off"). In some embodiments, it may be desirable to turn off the charger after the current reaches some minimum threshold (i.e., 100 mA). Thus, a stored charging parameter may be used to detect the current 207 while the system is in constant voltage mode. When the current 207 falls below a minimum programmed value, the system may automatically shut down the charger and end the charge cycle. Advantageously, the above parameters may be programmed across a range of values to optimize the particular characteristics of a particular battery during the batteries lifetime, between different charge cycles, or even during a single charge cycle.

Figure 3:
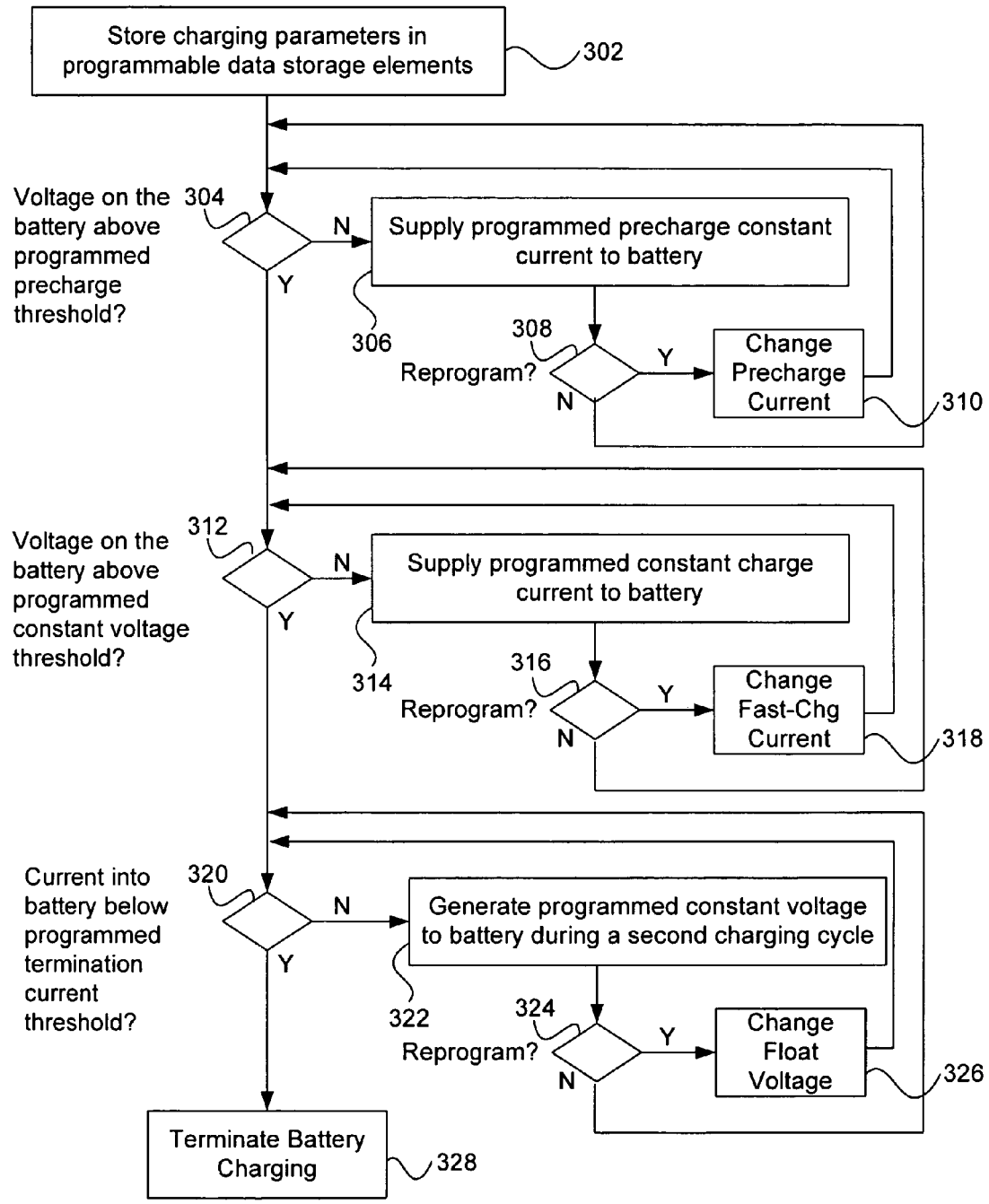
FIG. 3 illustrates the use of programmed battery charging parameters according to one embodiment of the present invention.

FIG. 3 illustrates the use of programmed battery charging parameters according to one embodiment of the present invention. This example illustrates several features of the present invention. At charging parameters corresponding to battery charge characteristics are stored in programmable data storage elements. The charging parameters may be stored as a plurality of digital bits in registers, volatile memory arrays, or nonvolatile memory elements, for example. Storing parameters as multiple bits allows programming of multiple values for each parameter. Accordingly, system parameters, such as currents, voltages, or thresholds, may be programmed across a range of values to accommodate a broad range of battery characteristics. At the voltage on the battery is sensed to determine if the battery voltage is above or below the programmed precharge threshold. If the battery voltage is below the programmed threshold, the programmed constant precharge current is supplied to the battery at 306. In one embodiment, the stored charging parameters may be changed while the battery is charging. For example, if a reprogramming instruction is given at 308, then the charging parameters that control the constant precharge current may be changed at 310, thereby changing the precharge current value delivered to the battery. If the battery voltage increases above the programmed precharge threshold, but still below the float voltage, then the constant current supplied to the battery is increased at 314. The fast charge current may also be changed dynamically during charging by reprogramming the corresponding charging parameter stored in the system as shown at 316 and 318. If the voltage on the battery increases to the programmed constant current/constant voltage threshold, the system changes from supplying a constant current to providing a constant voltage to the battery at 322. The float voltage may also be reprogrammed across a range of values at 324 and 326. At 320, current into the battery is sensed, and charging is terminated at 328 if the taper current falls below a programmed threshold.

Figure 4A:
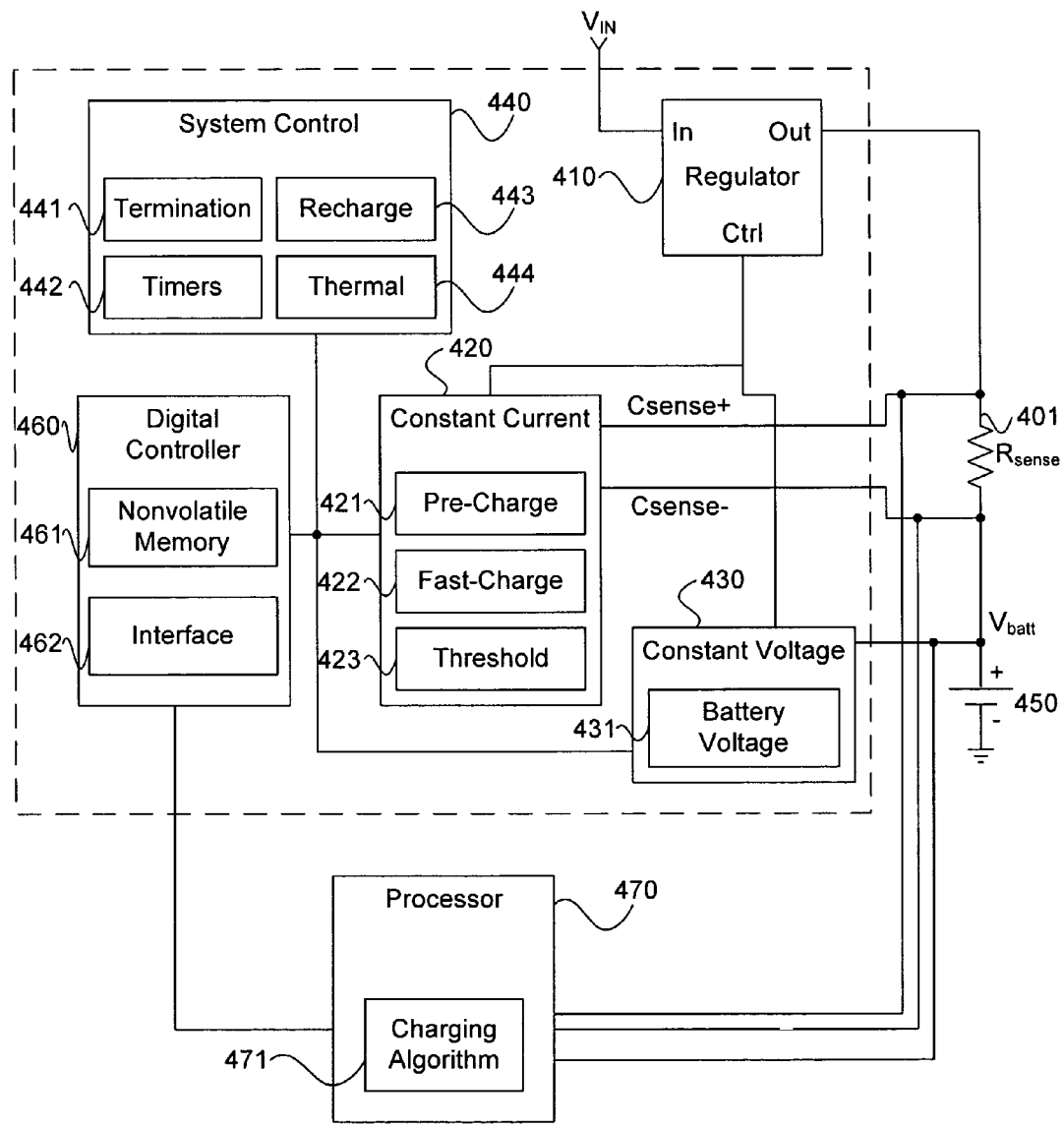
FIG. 4A illustrates a battery charging system according to one embodiment of the present invention.

FIG. 4 illustrates a battery charging system according to one embodiment of the present invention. Battery charger 400 includes a regulator 410 having an input terminal coupled to receive a power source (e.g., Vin) and an output terminal to provide a regulated output to battery 450. In this example, the current into the battery is sensed by coupling the output of regulator 410 to battery 450 through a resistor 401 ("Rsense"). This example further includes a constant current control 420 and constant voltage control 430 coupled to a control input of regulator 410. Constant current control 420 is active when the voltage on battery 450 is below a programmed threshold. Constant current control 420 includes a stored constant precharge current parameter 421, a stored constant fast charge parameter 422, and a stored precharge threshold parameter 423 for setting the precharge current, fast charge current, and the precharge threshold, respectively. In this example, constant current control 420 maintains a constant current by sensing the voltage through resistor 401 (e.g., Csense+, Csense−). Constant voltage control 430 is active when the voltage on battery 450 is above the programmed threshold. The stored battery voltage parameter 431 is used to set the constant current to constant voltage transition threshold. In this example, constant voltage control 430 maintains a constant voltage set by parameter 431 at the battery by sensing the voltage at the battery terminal (Vbatt) and adjusting the control terminal of regulator 410 accordingly.

Embodiments of the present invention further include programming a variety of other parameters relating to the battery charging process. For example, system control 440 includes a termination current parameter for programming the minimum threshold for the battery current. If the battery current falls below the value set by parameter 441, then the charging cycle will terminate. Additionally, the system may store parameters for setting timers 442. For example, a timer may be started when a constant precharge current is initiated. The programmable timer may be used to measuring a time the constant precharge current is supplied to the battery. If the voltage on the battery is below the precharge threshold after the timer reaches a programmed value, the system may automatically terminate the constant current and shut down ("time out"), thereby ending the charge cycle. Similarly, a programmed parameter may be used to measure a time the fast charge current is supplied to the battery and set the "time out" for the fast charge current.

In one embodiment, the system may include programmable thermal control. Programmable thermal parameters 444 may include under-temperature and over-temperature parameters that are stored and used to control the operation of the system across temperature. If the temperature of the battery is above the programmed over-temperature limit or below the programmed under-temperature limit, then charging may be suspended. Thermal parameters 444 may also include bias control parameters to program a bias current into a battery temperature sensor. In one embodiment, the battery temperature sensor is an external negative temperature coefficient thermistor. Accordingly, programmable bias control allows for the use of different batteries having different thermistor values, for example. In another embodiment, the system may include a recharge parameter 443. After a charge cycle, the battery may be automatically recharged ("topped off"). For example, when the input power supply is still present, the float voltage may fall below a programmed recharge threshold, a new charge cycle will automatically be initiated.

Battery charger 400 further includes a digital controller 460, which may be implemented using a microcontroller, processor, or state machine, for example. Controller 460 may include (or be coupled to) a nonvolatile memory 461 for storing one or more of the charging parameters. Controller 460 may also include an interface 462 for communicating with external resources or a processor 470 located on the same electronic device. In one embodiment, charging parameters may be stored in nonvolatile memory 461 and transferred to volatile storage devices. Controller 460 may interface with processor 470 to reprogram the stored parameters either in nonvolatile memory or in volatile memory. For example, processor 470 may include a software charging algorithm 471 for changing the parameters. The processor may be coupled to analog-to-digital circuits (not shown) that sense battery voltage and current, and the algorithm may change the stored parameters based on the sensed currents and voltages in the battery, for example.

Figure 4B:
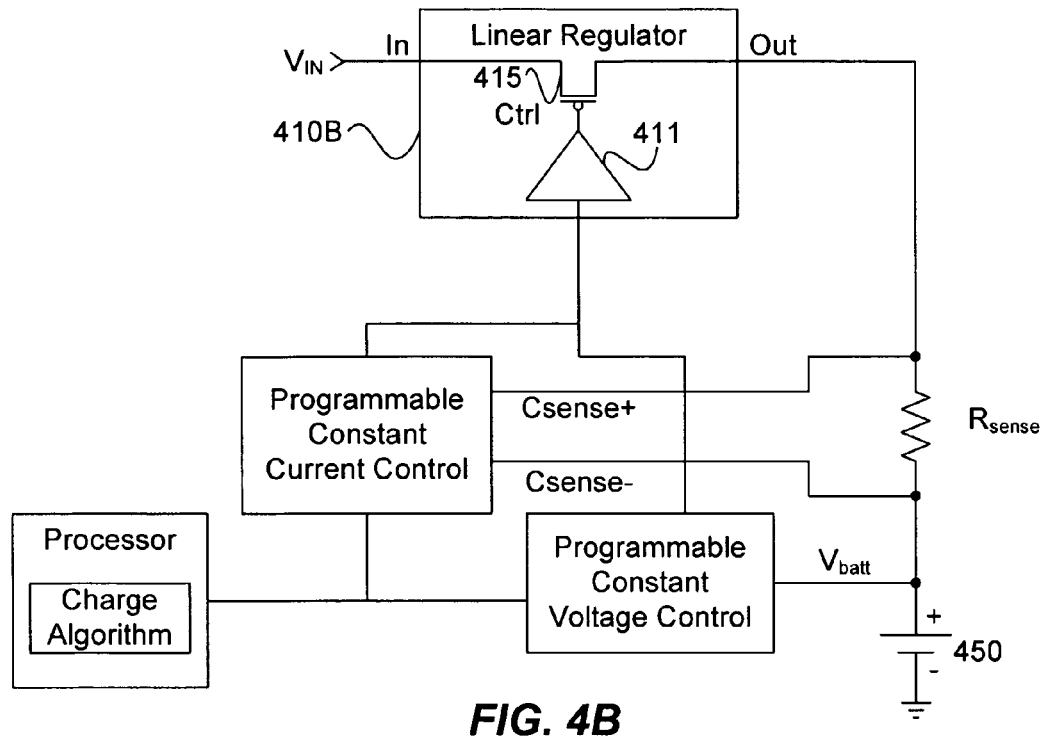
FIGS. 4B-C illustrate alternative implementations of a battery charger according to embodiments of the present invention.
Figure 4C:
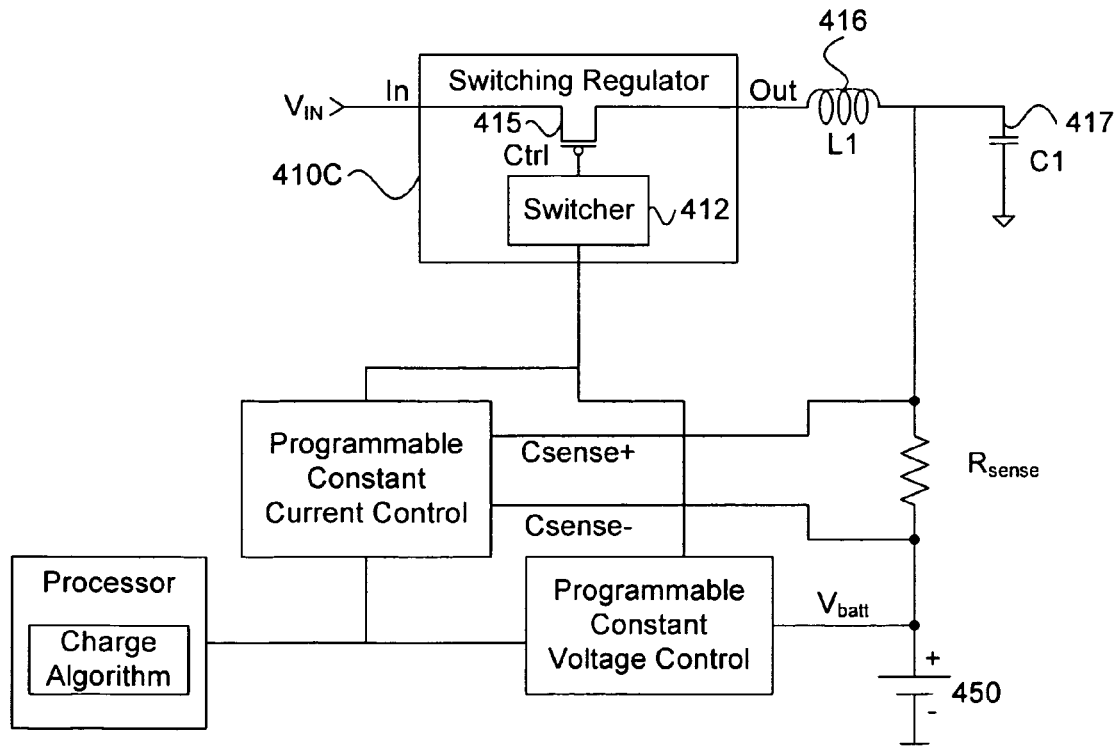

FIGS. 4B-C illustrate alternative implementations of a battery charger according to embodiments of the present invention. As shown in FIG. 4B, regulator 410B according to one embodiment of the present invention may be a linear regulator. Linear regulator 410B may include a transistor 415 (e.g., a PMOS transistor) and an analog control circuit 411 for receiving a control signal from either the constant current control or constant voltage control, and adjusting the voltage on the control terminal of transistor 415 to maintain a constant current or constant voltage. As shown in FIG. 4C, regulator 410C according to one embodiment of the present invention may be a switching regulator. Switching regulator 410C includes a transistor 415 (e.g., a PMOS transistor) a switching circuit 412 (e.g., a pulse width modulator) coupled through an inductor 416 and capacitor 417 to battery 450. The switcher 412 receives a control signal from either the constant current control or constant voltage control, and adjusts the switching signal on the control terminal of transistor 415 to maintain a constant current or constant voltage at the battery.

Figure 5:
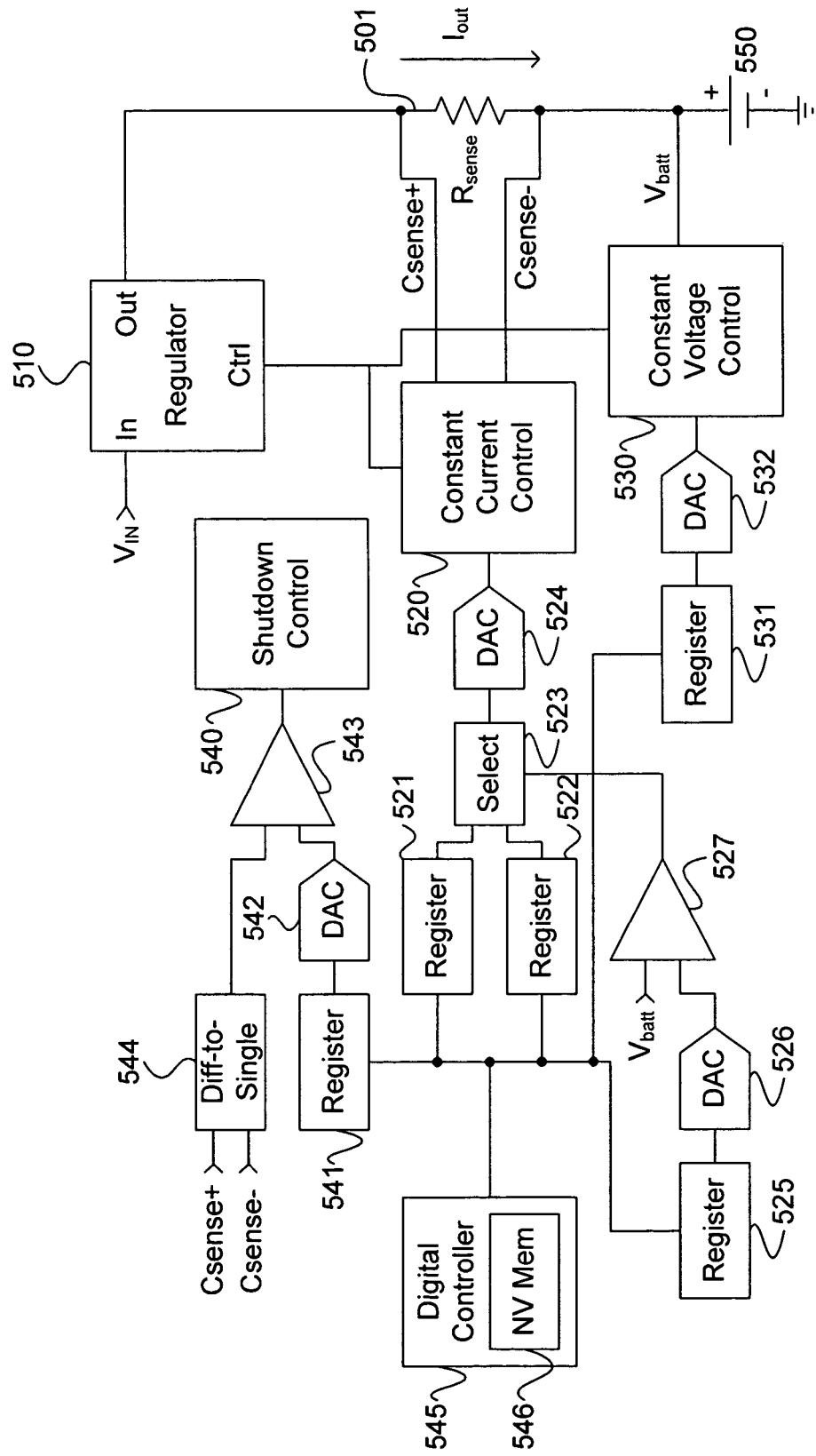
FIG. 5 illustrates a battery charging system according to one embodiment of the present invention.

FIG. 5 illustrates a battery charging system according to one embodiment of the present invention. Battery charger 500 includes a regulator 510 having an input for receiving a power source and an output coupled to battery 550 through a current sense resistor 501. A constant current control 520 senses the current in resistor 501 and provides a signal to a control input of regulator 510 for maintaining a constant current. The constant current may be programmed by parameters stored as digital values in registers 521, 522, and 525. For example, register 521 may store a digital precharge parameter value, and register 522 may store a digital fast charge parameter value. The two different values may be selectively coupled to the constant current control 520 to set the constant current supplied to the battery. Register 525 may hold a digital value for setting the precharge threshold. The bits of register 525 may be inputs to a digital-to-analog converter ("DAC") 526, which may translate the bits into an analog parameter such as a voltage, for example. A voltage output of DAC 526 may be used as a reference and compared to the battery voltage in comparator 527. When the battery voltage is below the programmed precharge threshold, the comparator may couple the stored precharge current value in register 521 to DAC 524 using select circuit 523 (e.g., a multiplexer). DAC 524, in turn, receives the digital value corresponding to the precharge current and generates an analog parameter for controlling the regulator to deliver the programmed current value. When the battery voltage increases above the value programmed in register 525, the comparator changes state, and select circuit 523 couples the stored fast charge current value in register 521 to DAC 524. DAC 524, in turn, receives the new digital value corresponding to the fast charge current and generates an analog parameter for controlling the regulator to deliver the new programmed current value. It is to be understood that the above circuit is just one example implementation. In another example, the precharge threshold may be controlled by using the battery voltage to drive a voltage divider. Particular taps of the voltage divider may be digitally selected by a programmable register. A selected tap may then be coupled to a comparator and compared to a reference voltage, for example.

Similarly, constant voltage control 530 is coupled to register 531 for storing the threshold for changing from constant current to constant voltage. Register 531 stores the threshold as a digital value. The digital bits of register 531 are input to DAC 532 and converted into an analog parameter for maintaining a constant programmed voltage on the battery.

In this example, register 541 is used to program the termination current value. Battery current Iout may be sensed by resistor 501 and the differential voltage may be converted to a single ended value in differential-to-single ended converter 544. The digital value in register 544 corresponding to the desired termination current may be converted into a voltage by DAC 542. The voltage from both the differential-to-single ended converter 544 and DAC 542 may be input to comparator 543. When the battery current decreases (tapers off) below the programmed value, the comparator may generate a signal to shutdown control 540 and terminate the charge cycle.

Battery charger 500 includes a controller 545 for manipulating digital information in the system. Controller may include circuits for reading and writing to memory or registers, for example, as well as other system control functions such as interfacing with other electronics over a serial or parallel bus. As mentioned above, the charging parameters may be stored in a nonvolatile memory 546 such as an EEPROM, for example. In this example, the parameters are stored in nonvolatile memory 546 and transferred to registers 521, 522, 525, 531, and 541. If a software algorithm is used to modify the parameters, the algorithm may change the parameter values in either the registers (e.g., for dynamic programming) or in the nonvolatile memory (e.g., for static programming).

Figure 6:
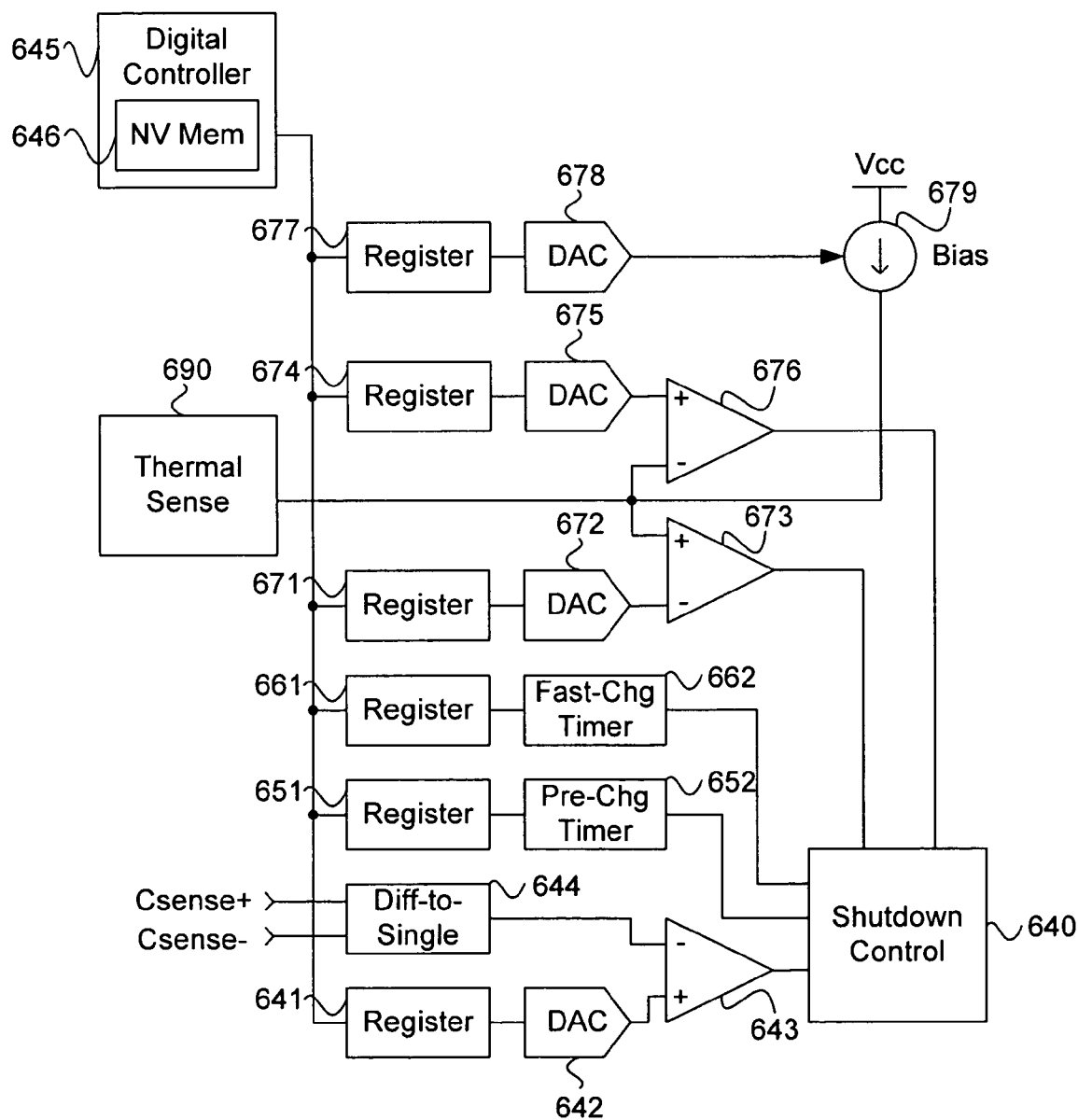
FIG. 6 illustrates battery charging parameters according to one embodiment of the present invention.

FIG. 6 illustrates battery charging parameters according to one embodiment of the present invention. In this example, a variety of stored parameters are programmed by controller 645 to condition the charge cycle by loading registers with charging parameters stored in nonvolatile memory 646. For example, register 641 is used to program the termination current in conjunction with DAC 642, differential-to-single ended converter 644 and comparator 643 as described above in reference to FIG. 5. Additionally, register 651 may be used to program a precharge timer 652, and register 661 may be used to program a fast charge timer 662. Timer 652 may shut down the charge cycle if the voltage on the battery does not increase above a programmed precharge threshold value within the programmed time period. Likewise, timer 662 may shut down the charge cycle if the voltage on the battery does not increase above a programmed constant current to constant voltage transition threshold within the programmed time period.

Registers 671 and 674 may be programmed with over-temperature and under-temperature parameters. The digital values of registers 671 and 674 are coupled to the inputs of comparators 673 and 676, respectively, and define the upper and lower bounds of a voltage range. The other inputs to comparators 673 and 674 are coupled to a thermal sensor 690 that detects the batteries temperature. If the battery temperature results in a voltage that is above the programmed over-temperature limit or is below under-temperature limit, the comparators will shut down the charge cycle to protect the battery. In one embodiment, a bias current 679 is programmed by register 677 and DAC 678 to adjust the voltage on the thermal sensor. In one specific example, the thermal sensor includes a negative temperature coefficient thermistor, and the bias current may be programmed to optimize the temperature range of the thermal sense circuits.

Figure 7A:
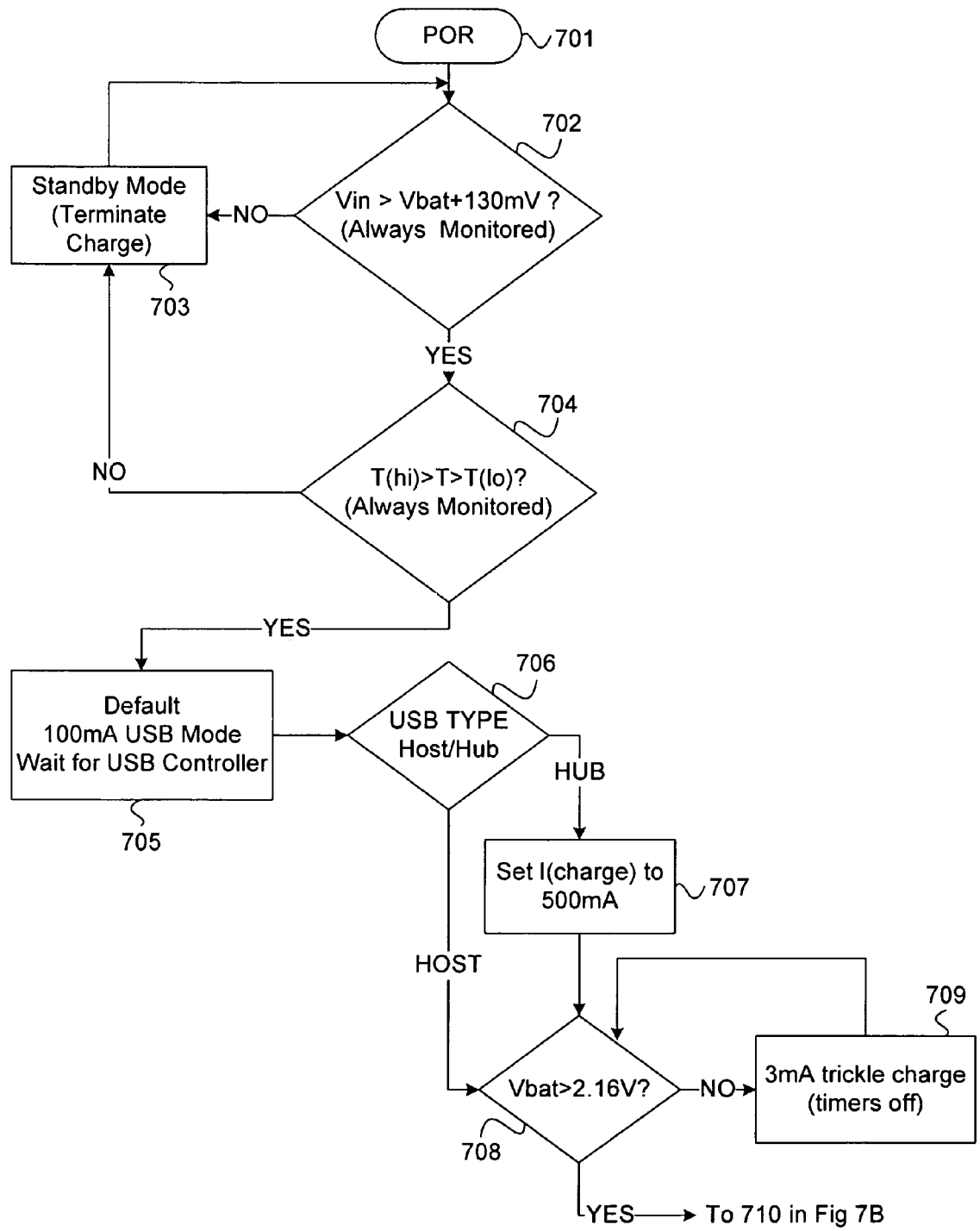
FIG. 7 is an example charge cycle according to one embodiment of the present invention.
Figure 7B:
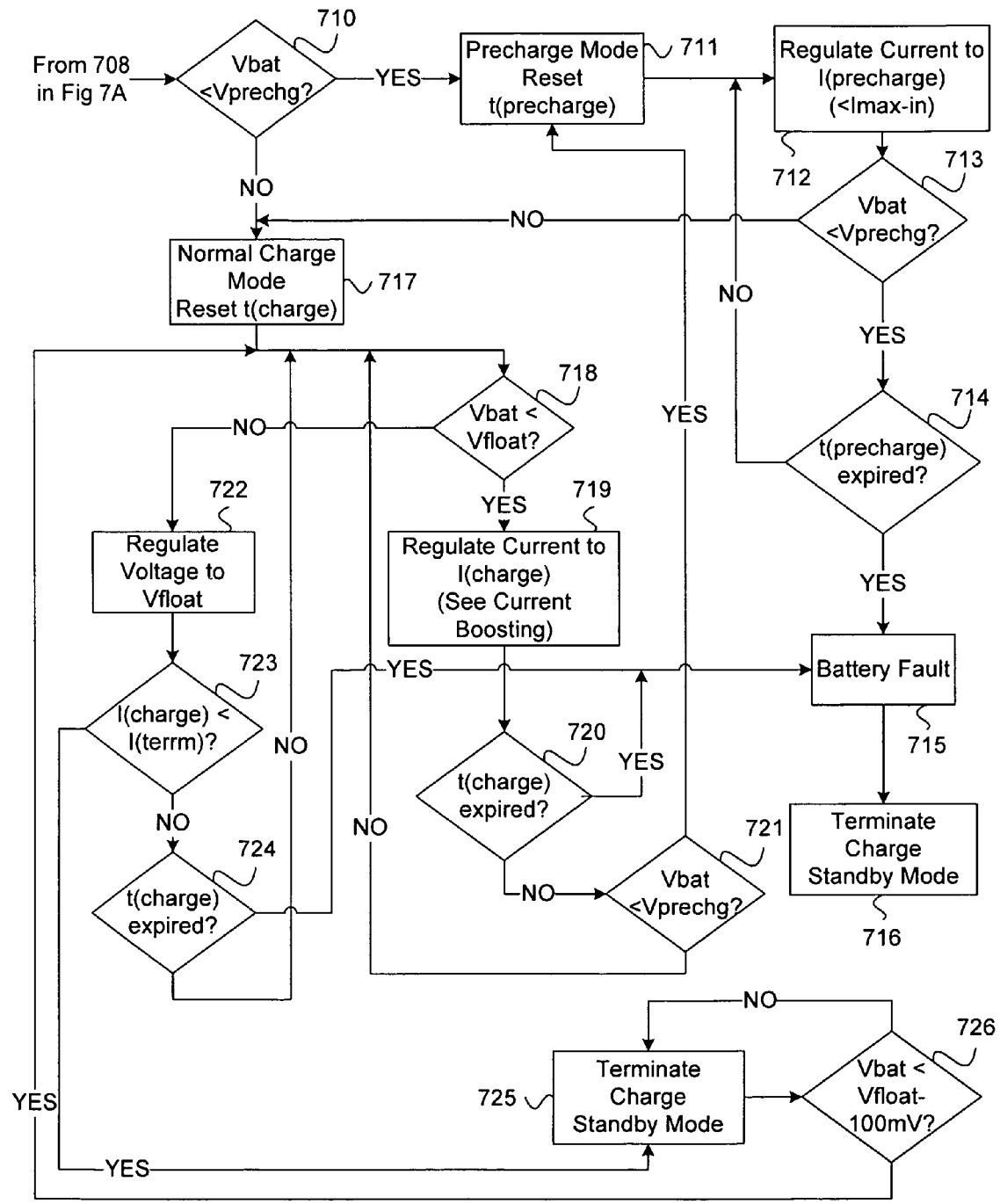

FIG. 7 is an example charge cycle according to one embodiment of the present invention. The present example may be used in an application where the input voltage is a USB power terminal, for example. In the following example, many of the charge cycle parameters are programmable according to the techniques described above, and may be configured and changed over a serial or parallel bus, for example. The charge cycle begins with a power on reset ("POR") 701. At 702, the input voltage is sensed or otherwise measured and compared against the battery voltage and an added offset. In this example, if the input voltage is less than the battery voltage plus 130 mV, then the system terminates charging and enters a standby mode at 703. If the input voltage is greater than the battery voltage plus 130 mV, then the temperature is sensed and checked at 704. If the temperature of the battery is determined to be outside an allowable range (i.e., T(hi)>T>T(lo)), then the system terminates charging. However, if the temperature of the battery is determined to be within an allowable range, then the charge cycle continues to 705. As mentioned above, the characteristics of the temperature check may be programmable. The following Tables 1-2 illustrated example programming of bias current for measuring battery temperature, and over-temperature and under-temperature.

TABLE 1

| Bit1 | Bit0 | Thermistor Current |
|---|---|---|
| 0 | 0 | 100 μA (10k NTC) |
| 0 | 1 | 40 μA (25k NTC) |
| 1 | 0 | 10 μA (100k NTC) |
| 1 | 1 | 0 μA (Disabled) |

TABLE 2

| Bit2 | Bit1 | Bit0 | Low Temp | Bit2 | Bit1 | Bit0 | High Temp |
|---|---|---|---|---|---|---|---|
| 0 | 0 | 0 | −20° C. | 0 | 0 | 0 | +30° C. |
| 0 | 0 | 1 | −15° C. | 0 | 0 | 1 | +35° C. |
| 0 | 1 | 0 | −10° C. | 0 | 1 | 0 | +40° C. |
| 0 | 1 | 1 | −5° C. | 0 | 1 | 1 | +45° C. |
| 1 | 0 | 0 | 0° C. | 1 | 0 | 0 | +50° C. |
| 1 | 0 | 1 | +5° C. | 1 | 0 | 1 | +55° C. |
| 1 | 1 | 0 | +10° C. | 1 | 1 | 0 | +60° C. |
| 1 | 1 | 1 | +15° C. | 1 | 1 | 1 | +65° C. |

In this example, the system is charging from a USB power supply input. Thus, the system defaults to 100 mA USB mode and waits for the USB controller to specify the USB type (i.e., HUB or HOST). A USB HOST can supply a maximum of 100 mA, whereas a USB HUB can supply a maximum of 500 mA. The system determines the USB host type at 706. For a USB HOST, the constant fast charge current will remain set at the default 100 mA level. For a USB HUB, the constant fast charge current is programmed to 500 mA maximum. For example, in one embodiment the system may include a first register storing a charge parameter for programming the pre-charge current from 25 mA to 212.5 mA in 12.5 mA steps. Another register may be used to program a fast charge current from 125 mA to 500 mA in 25 mA steps. When the system is in HOST mode, the system disables the fast charge register and constrains the bits provided from the precharge register to a DAC so that the output current cannot exceed 100 mA.

At 708, the system senses the battery voltage. In this example, the system may first compare the battery voltage to a programmable threshold at 708 for starting a "trickle charge." If the battery voltage is below 2.16V, a trickle current (e.g., 3 mA) may be generated and the timers turned off (i.e., no time out) at 709. According to one embodiment of the invention, the trickle charge threshold and constant trickle current are programmable by storing corresponding charge parameters. If the battery voltage increases above the trickle threshold, the system will generate a programmed constant precharge current and continue to monitor the battery voltage. As long as the voltage on the battery is below the precharge threshold at 710 the system will be in precharge mode at 711. As described above, the precharge threshold is programmable across a range of values. The following table illustrates different precharge thresholds that may be programmed by different charge parameter values (e.g., bits 0 ... 2) in a programmable register or other programmable memory, for example.

TABLE 3

| Bit2 | Bit1 | Bit0 | Pre-charge to Fast-charge Voltage Threshold |
|---|---|---|---|
| 0 | 0 | 0 | 2.4 V |
| 0 | 0 | 1 | 2.5 V |
| 0 | 1 | 0 | 2.6 V |
| 0 | 1 | 1 | 2.7 V |
| 1 | 0 | 0 | 2.8 V |
| 1 | 0 | 1 | 2.9 V |
| 1 | 1 | 0 | 3.0 V |
| 1 | 1 | 1 | 3.1 V |

At 712, the system starts a timer and generates a programmed constant precharge current. The following table illustrates different precharge currents that may be programmed by different charge parameter values (e.g., bits 0 ... 3) in a programmable register or other programmable memory, for example.

TABLE 4

| Bit3 | Bit2 | Bit1 | Bit0 | Pre-charge current |
|---|---|---|---|---|
| 0 | 0 | 0 | 0 | 25 mA |
| 0 | 0 | 0 | 1 | 37.5 mA |
| 0 | 0 | 1 | 0 | 50 mA |
| 0 | 0 | 1 | 1 | 62.5 mA |
| 0 | 1 | 0 | 0 | 75 mA |
| 0 | 1 | 0 | 1 | 87.5 mA |
| 0 | 1 | 1 | 0 | 100 mA |
| 0 | 1 | 1 | 1 | 112.5 mA |
| 1 | 0 | 0 | 0 | 125 mA |
| 1 | 0 | 0 | 1 | 137.5 mA |
| 1 | 0 | 1 | 0 | 150 mA |
| 1 | 0 | 1 | 1 | 162.5 mA |
| 1 | 1 | 0 | 0 | 175 mA |
| 1 | 1 | 0 | 1 | 187.5 mA |
| 1 | 1 | 1 | 0 | 200 mA |
| 1 | 1 | 1 | 1 | 212.5 mA |

While the system is supplying a constant precharge current, the system senses the battery voltage at 713. If the battery voltage remains below the programmed precharge threshold, the system will continue supplying the precharge current and the timer will continue to operate. If the battery voltage remains below the precharge threshold when the timer expires at 714, the system will generate a battery fault at 715 and terminate the charge cycle at 716. The precharge timeout is also programmable. The following table illustrates different timeouts that may be programmed by different charge parameter values (e.g., bits 0 . . . 2) in a programmable register or memory:

TABLE 5

| Bit1 | Bit0 | Pre-charge Timeout |
|---|---|---|
| 0 | 0 | 2621 sec |
| 0 | 1 | 5242 sec |
| 1 | 0 | 10484 sec |
| 1 | 1 | Disabled |

When the precharge current increases the battery voltage above the precharge threshold, the system will switch to "normal" or "fast charge" mode at 717. In this mode, the system will reset a programmable fast charge timer and supply a programmed constant current, which has a maximum of 100 mA for a USB HUB or 500 mA for a USB HOST. The fast charge timer is also programmable as follows:

TABLE 6

| Bit1 | Bit0 | Fast-charge Timeout |
|---|---|---|
| 0 | 0 | 20972 sec |
| 0 | 1 | 41943 sec |
| 1 | 0 | 83886 sec |
| 1 | 1 | Disabled |

During fast charging, the voltage on the battery is again monitored at 718. While the voltage on the battery is less than the programmed float voltage ("Vfloat") the charging system will regulate the programmed constant current to the battery at 719. The following table illustrates fast charge currents that may be programmed for a USB HUB. USB HOST fast charge currents are limited to 100 mA max. This may be done by using the precharge register for precharge, and then reprogramming the register for a higher current during fast charge, for example.

TABLE 7

| Bit3 | Bit2 | Bit1 | Bit0 | Fast Charge Current |
|---|---|---|---|---|
| 0 | 0 | 0 | 0 | 125 mA |
| 0 | 0 | 0 | 1 | 150 mA |
| 0 | 0 | 1 | 0 | 175 mA |
| 0 | 0 | 1 | 1 | 200 mA |
| 0 | 1 | 0 | 0 | 225 mA |
| 0 | 1 | 0 | 1 | 250 mA |
| 0 | 1 | 1 | 0 | 275 mA |
| 0 | 1 | 1 | 1 | 300 mA |
| 1 | 0 | 0 | 0 | 325 mA |
| 1 | 0 | 0 | 1 | 350 mA |
| 1 | 0 | 1 | 0 | 375 mA |
| 1 | 0 | 1 | 1 | 400 mA |
| 1 | 1 | 0 | 0 | 425 mA |
| 1 | 1 | 0 | 1 | 450 mA |
| 1 | 1 | 1 | 0 | 475 mA |
| 1 | 1 | 1 | 1 | 500 mA |

If the fast charge timer expires at 720 before the voltage on the battery reaches the float threshold at 721, the system will issue a battery fault at 715 and terminate the charge cycle at 716. However, if the battery voltage increase to the programmed float voltage before the timer expires, the system will transition to constant voltage regulation mode and set a constant voltage timer. The float voltage provided to the battery is also set by programming instructions. The following table illustrates available float voltages that may be programmed. From the table below it can be seen that a range of voltages may be programmed at the output of the charger. Thus, a variety of batteries or battery conditions may be accommodated by battery charges using the techniques disclosed herein.

TABLE 8

| Bit4 | Bit3 | Bit2 | Bit1 | Bit0 | Float Voltage |
|---|---|---|---|---|---|
| 0 | 0 | 0 | 0 | 0 | 4.000 V |
| 0 | 0 | 0 | 0 | 1 | 4.020 V |
| 0 | 0 | 0 | 1 | 0 | 4.040 V |
| 0 | 0 | 0 | 1 | 1 | 4.060 V |
| 0 | 0 | 1 | 0 | 0 | 4.080 V |
| 0 | 0 | 1 | 0 | 1 | 4.100 V |
| 0 | 0 | 1 | 1 | 0 | 4.120 V |
| 0 | 0 | 1 | 1 | 1 | 4.140 V |
| 0 | 1 | 0 | 0 | 0 | 4.160 V |
| 0 | 1 | 0 | 0 | 1 | 4.180 V |
| 0 | 1 | 0 | 1 | 0 | 4.200 V |
| 0 | 1 | 0 | 1 | 1 | 4.220 V |
| 0 | 1 | 1 | 0 | 0 | 4.240 V |
| 0 | 1 | 1 | 0 | 1 | 4.260 V |
| 0 | 1 | 1 | 1 | 0 | 4.280 V |
| 0 | 1 | 1 | 1 | 1 | 4.300 V |
| 1 | 0 | 0 | 0 | 0 | 4.320 V |
| 1 | 0 | 0 | 0 | 1 | 4.340 V |
| 1 | 0 | 0 | 1 | 0 | 4.360 V |
| 1 | 0 | 0 | 1 | 1 | 4.380 V |
| 1 | 0 | 1 | 0 | 0 | 4.400 V |
| 1 | 0 | 1 | 0 | 1 | 4.420 V |
| 1 | 0 | 1 | 1 | 0 | 4.440 V |
| 1 | 0 | 1 | 1 | 1 | 4.460 V |
| 1 | 1 | 0 | 0 | 0 | 4.480 V |
| 1 | 1 | 0 | 0 | 1 | 4.500 V |
| 1 | 1 | 0 | 1 | 0 | 4.520 V |
| 1 | 1 | 0 | 1 | 1 | 4.540 V |
| 1 | 1 | 1 | 0 | 0 | 4.560 V |
| 1 | 1 | 1 | 0 | 1 | 4.580 V |
| 1 | 1 | 1 | 1 | 0 | 4.600 V |
| 1 | 1 | 1 | 1 | 1 | 4.620 V |

While the voltage at the output is maintained at the programmed float voltage, the current into the battery will begin to taper off (decrease). The charging system monitors the current at 723, and if the current into the battery during constant voltage regulation decreases below a programmed termination current threshold, the system will terminate the charge cycle at 725. Alternatively, if the current into the battery remains above the programmed termination threshold longer than the programmed constant voltage timer at 724, then the system may time out at 724, generate a battery fault at 715, and terminate the charge cycle at 716. If the current falls below the programmed termination current threshold before the timer expires, then the charger will terminate the charge cycle and transition to a standby mode at 725. While in standby mode, the system will monitor the battery voltage, and if the battery voltage falls below a predefined level (e.g., 100 mV below the programmed float voltage), then the system may enter a "top off" cycle.

Figure 8:
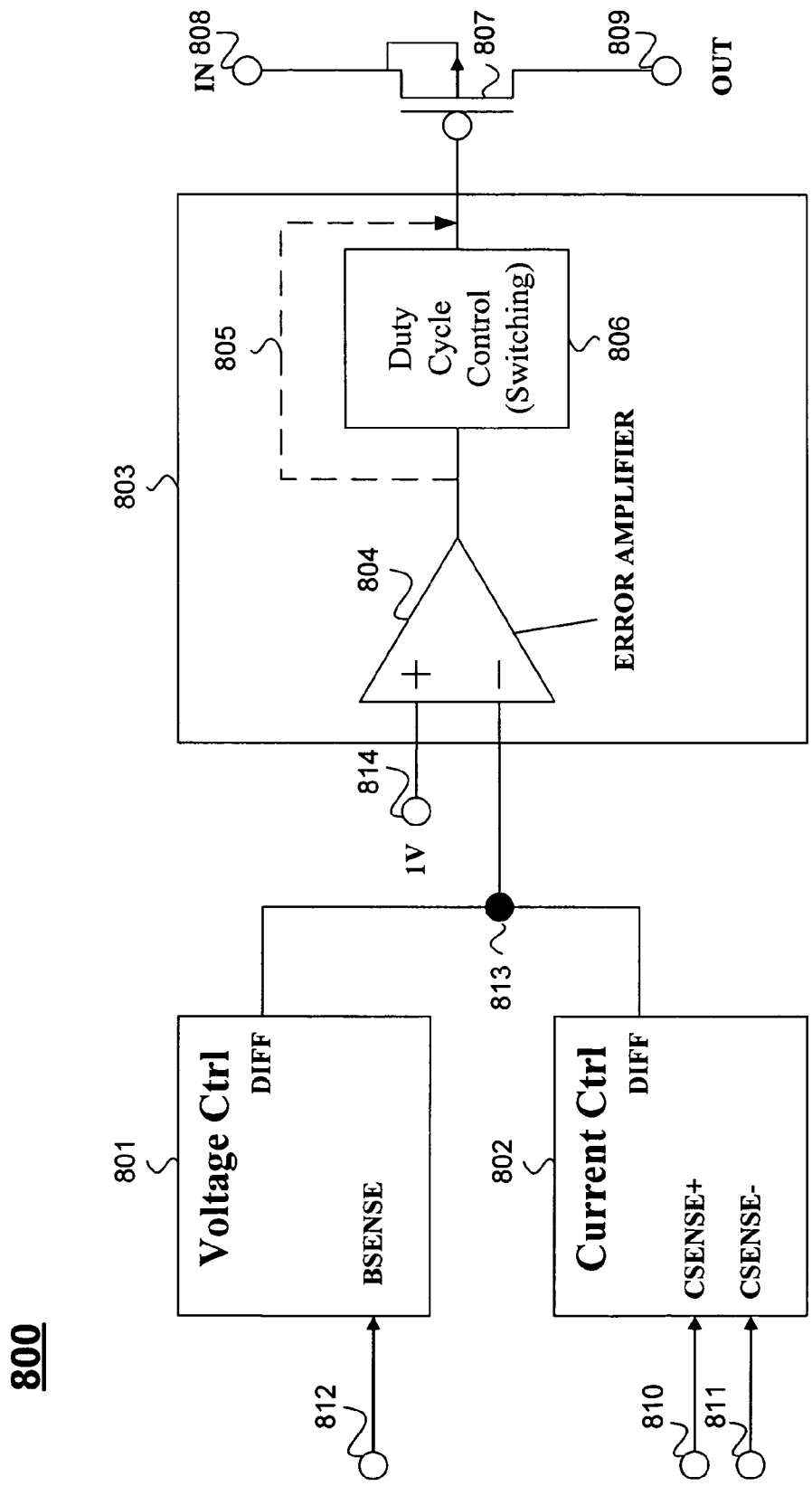
FIG. 8 is an example of a battery charger according to one embodiment of the present invention.

FIG. 8 is an example of a battery charger according to one embodiment of the present invention. Battery charger 800 includes a constant voltage controller 801, a constant current controller 802, and a regulator 803 coupled to a transistor 807 (e.g., a PMOS transistor) for controlling the voltage and current coupled between an input terminal 808 and an output terminal 809. Constant current controller 802 includes a first input terminal 810 and a second input terminal 811 for sensing the current through a resistor (e.g., 0.1 Ohm Resistor). Terminal 810 is coupled to the positive terminal of the resistor, which is coupled to terminal 809 of transistor 807, and terminal 811 is coupled to the negative terminal of the resistor, which is coupled to a battery (in a switching regulator, terminal 809 is coupled to an inductor, and the other terminal of the inductor may be coupled to terminal 810). The output of current controller 802 is coupled to the input of regulator 803. Constant voltage controller 801 includes a battery sense input terminal 812, which is coupled to the battery. The output of voltage controller 801 is also coupled to the input of regulator 803. Regulator 803 may include an error amplifier 804 having a first input coupled to a reference voltage 814 (e.g., 1 volt) and a second input terminal coupled to the output of the voltage controller 801 and current controller 802. Regulator may be either a switching or linear regulator. If regulator 803 is a linear regulator, then the output of the error amplifier may be coupled, either directly or through linear circuits, to the gate of transistor 807 via path 805. If regulator is a switching regulator, then the output of error amplifier 804 is coupled to the input of a switching circuit, such as a duty cycle control of a pulse width modulation ("PWM") circuit, for example. It is to be understood that a variety of switching techniques could be used to practice the present invention. Node 813 is a negative feedback node of the regulator. Thus, under either constant current control or constant voltage control, the loop will drive node 813 to the same voltage as the reference voltage of the error amplifier (e.g., 1 volt).

Figure 9:
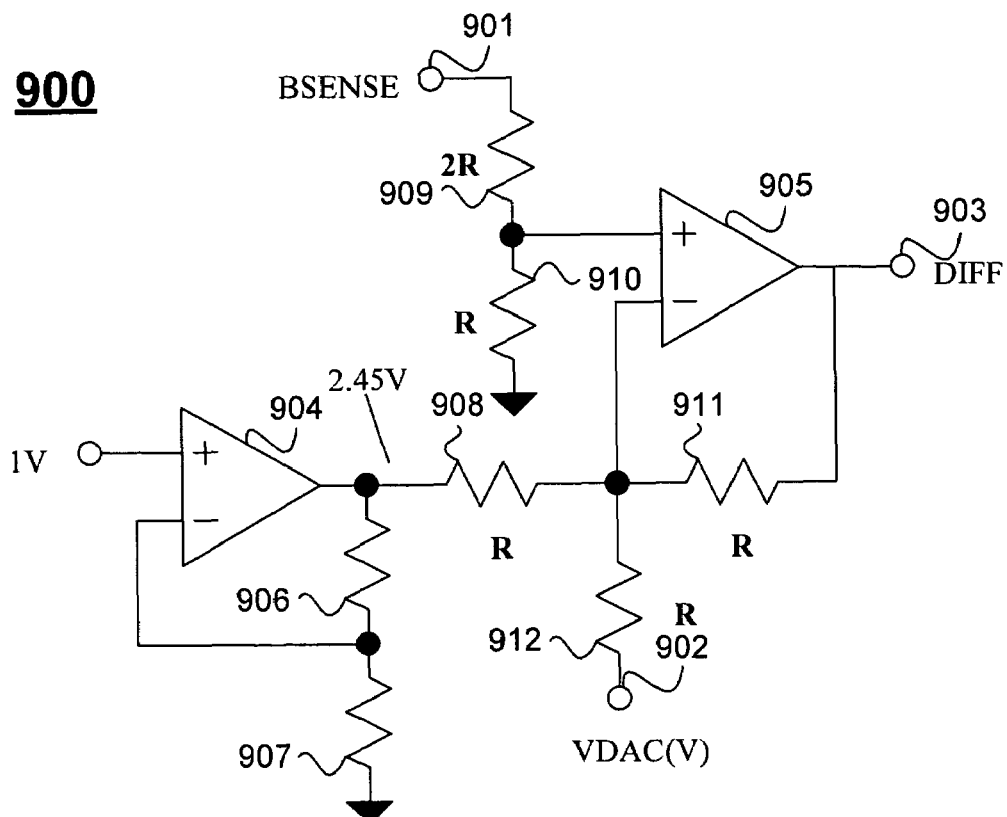
FIG. 9 is an example of a constant voltage control circuit according to one embodiment of the present invention.

FIG. 9 is an example of a constant voltage control circuit according to one embodiment of the present invention. Constant voltage control circuit 900 is just one example of a control circuit that may be used to practice different embodiments of the invention. In this example, a battery sense terminal 901 is coupled to a battery to be charged. A second input terminal 902 is coupled to the output of a digital to analog converter ("VDAC") for setting the voltage at the battery terminal to a programmed voltage value. Terminal 902 may be coupled through the VDAC to a register or memory that stores a charging parameter to set the voltage at the battery. The battery voltage may be adjusted by changing the charging parameter, thereby changing the voltage at terminal 902 across a range of different values. For example, as mentioned above, the output of the constant voltage control circuit 900, DIFF, will be driven to the same voltage as the error amplifier reference, which is 1 volt in this example. A differential summing network including amplifiers 904 and 905 and the network of resistors 906-912 establish the following relation between the voltage at the output, DIFF, the battery voltage, BSENSE, and the DAC voltage, VDAC(V):

DIFF=$B$SENSE−(2.45V+VDAC(V)).

Thus, when DIFF is driven to 1 volt by the feedback loop, the battery voltage is a function of the voltage on the output of the DAC.

$B$SENSE=3.45+VDAC(V); when DIFF=1 volt.

Accordingly, the battery voltage may be programmed by changing the digital values of bits coupled to the input of the DAC.

Figure 10:
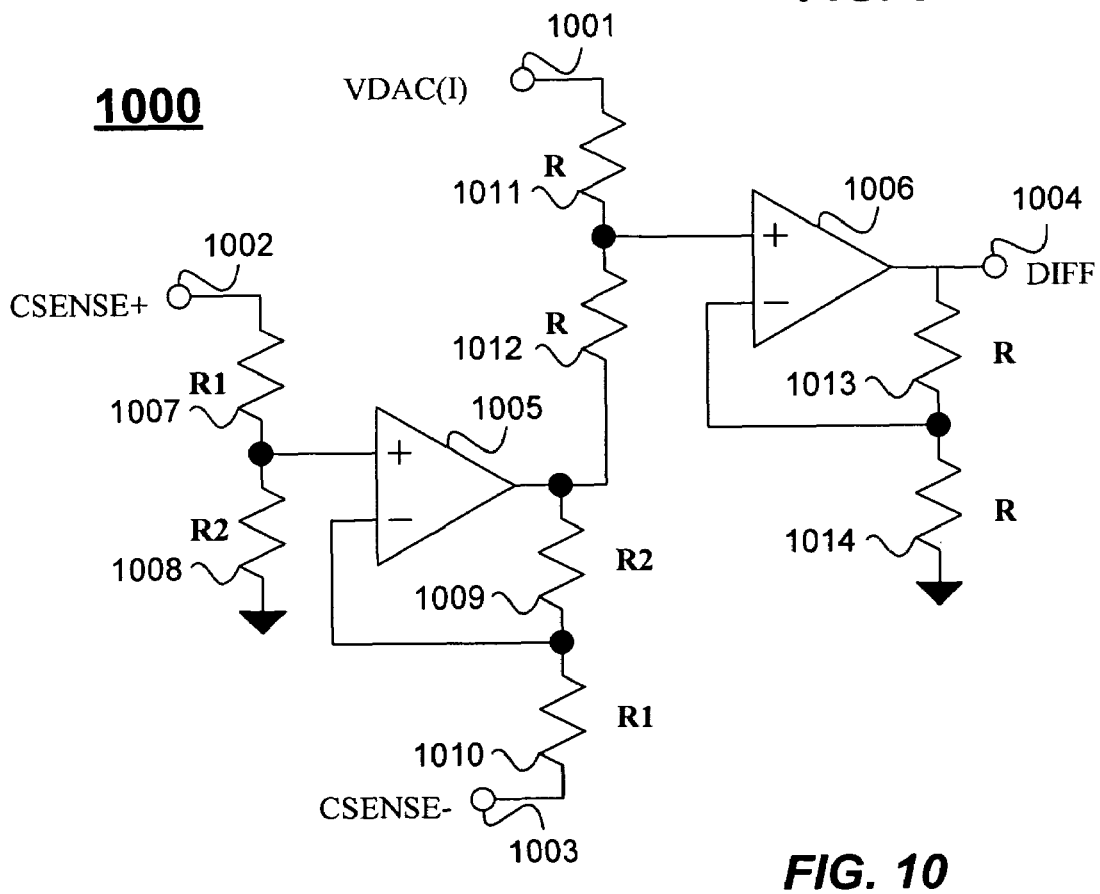
FIG. 10 is an example of a constant current control circuit according to one embodiment of the present invention.

FIG. 10 is an example of a constant current control circuit according to one embodiment of the present invention. Constant current control circuit 1000 is just one example of a control circuit that may be used to practice different embodiments of the invention. In this example, positive and negative sense terminals 1002-1003 are coupled across a sense resistor at the input of a battery to be charged. Input terminal 1001 is coupled to the output of a digital to analog converter ("VDAC") for setting the constant current into the battery to a programmed current value. Terminal 1001 may be coupled through the VDAC to a register or memory that stores a charging parameter to set the current into the battery. The battery current may be adjusted by changing the charging parameter, thereby changing the voltage at terminal 1001 across a range of different values. For example, as mentioned above, the output of the constant current control circuit 1000, DIFF, will be driven to the same voltage as the error amplifier reference, which is 1 volt in this example. A differential summing network including amplifiers 1005 and 1006 and the network of resistors 1007-1014 establish the following relation between the voltage at the output, DIFF, the battery current as measured by voltages, CSENSE+ and CSENSE−, and the DAC voltage, VDAC(I):

DIFF=$R2/R1$($C$SENSE+−$C$SENSE−)+VDAC(I).

Thus, when DIFF is driven to 1 volt by the feedback loop, the battery current is a function of the voltage on the output of the DAC.

($C$SENSE+−$C$SENSE−)=(1V−VDAC(I))/5; when DIFF=1 volt and $R2/R1$=5.

Accordingly, the constant current supplied to the battery by the regulator may be programmed by changing the digital values of bits coupled to the input of the DAC. While the above circuits in FIGS. 8-9 use differential summing techniques, it is to be understood that other current and/or voltage summing techniques could be used to sense the output battery current and voltage and generate control signals to drive the control input of a regulator.

Referring to FIGS. 8-10, one feature of the present invention may include connecting the outputs of the constant current controller and the constant voltage controller to the regulator using a "wired-OR" configuration. For example, in one embodiment, the output pull-down transistor of amplifier 905 in the constant voltage controller 900 and the output pull-down transistor of amplifier 1006 in the constant current controller 900 are "weak" devices. For example, the devices for sinking current from the DIFF node are much smaller than the devices in amplifiers 905 and 1006 for sourcing current into the DIFF node. During constant current mode, when the battery voltage is below the value programmed by VDAC(V), the positive input to amplifier 905 (BSENSE) is below the negative input, and the output of amplifier 905 will attempt to sink current from DIFF. However, the output of constant current control amplifier 1006 will be driving the DIFF node in the positive direction. Thus, because the pull-down output of amplifier 905 is weaker than the pull-up output of amplifier 1006, the system will be dominated by constant current controller 1000. Similarly, when the voltage on the battery (BSENSE) increases to the point where the positive and negative inputs of amplifier 905 are equal, the constant voltage control will dominate. At this point, the current through the sense resistor will begin to decrease, and the output of amplifier 1006 will start to pull down. However, because the pull-down output of amplifier 1006 is weaker than the pull-up output of amplifier 905, the system will be dominated by constant voltage controller 900.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A method of charging a battery comprising:
storing a plurality of charging parameters in one or more programmable data storage elements;
supplying a constant current to said battery during a first time period, wherein the constant current supplied is set by a first parameter of said stored charging parameters and the first parameter is variable across a range of values to program the constant current across a corresponding range of current values; and
generating a constant voltage to said battery during a second time period following the first time period if a voltage on the battery is above a first threshold, wherein the constant voltage is set by a second parameter of said stored charging parameters and the second parameter is variable across a range of values to program the constant voltage across a corresponding range of voltage values.

2. The method of claim 1 wherein said range of second charging parameter values includes at least a highest value, a lowest value, and a plurality of intermediate values between the highest and lowest values, and wherein said constant voltage is programmed to the highest value, the lowest value, or any intermediate value by the second charging parameter in one of the programmable data storage elements.

3. The method of claim 1 wherein said range of first charging parameter values includes at least a highest value, a lowest value, and a plurality of intermediate values between the highest and lowest values, and wherein said constant current is programmed to the highest value, the lowest value, or any intermediate value by the first charging parameter in one of the programmable data storage elements.

4. The method of claim 1 wherein supplying a constant current comprises:
supplying a first constant precharge current to said battery if a voltage on said battery is below a second threshold; and
supplying a second constant current to said battery if a voltage on said battery is above the second threshold, wherein the first constant precharge current and the second constant current are set by parameters stored in at least one of the programmable data storage elements.

5. The method of claim 4 wherein the second threshold is set by a parameter stored in at least one of the programmable data storage elements.

6. The method of claim 1 further comprising reprogramming one or more of the charging parameters stored in the data storage elements.

7. The method of claim 6 wherein the charging parameters are reprogrammed while the battery is charging.

8. The method of claim 6 wherein the constant current is reprogrammed to a plurality of different values during the first time period.

9. The method of claim 6 wherein the one or more charging parameters are reprogrammed in accordance with a predefined software algorithm.

10. The method of claim 9 wherein the algorithm changes one or more charging parameters while the battery is charging.

11. The method of claim 9 wherein the algorithm changes one or more charging parameters over multiple charging cycles.

12. The method of claim 9 wherein the algorithm changes the constant current based on a sensed battery voltage or current.

13. The method of claim 9 wherein the algorithm is executed on a processor and the processor reprograms one or more of the data storage elements, and in accordance therewith, changes a corresponding one or more charging parameters.

14. The method of claim 9 wherein the algorithm is stored in nonvolatile memory.

15. The method of claim 1 wherein the data storage element is a volatile storage device.

16. The method of claim 1 wherein the data storage element is a nonvolatile storage device.

17. The method of claim 16 wherein the plurality of charging parameters are stored in the nonvolatile storage device and transferred to a volatile storage device.

18. The method of claim 1 wherein the battery is charged using a linear regulator.

19. The method of claim 1 wherein the battery is charged using a switching regulator.

20. The method of claim 19 wherein the switching regulator switches at a first frequency, and wherein the first frequency is set by a parameter stored in one of the programmable data storage elements.

21. The method of claim 4 further comprising measuring a time the first constant precharge current is supplied to the battery and terminating the first constant precharge current if a voltage on said battery is below the second threshold after a predetermined time period, wherein the predetermined time period is set by a parameter stored in one of the programmable data storage elements.

22. The method of claim 4 further comprising measuring a time the second constant current is supplied to the battery and terminating the second constant current if a voltage on said battery is below the first threshold after a predetermined time period, wherein the predetermined time period is set by a parameter stored in one of the programmable data storage elements.

23. The method of claim 1 further comprising third and fourth stored parameters, wherein the third parameter is used to program an over-temperature limit and the fourth parameter is used to program an under-temperature limit, and wherein if the temperature of the battery is above the over-temperature limit or below the under-temperature limit, then charging is suspended.

24. The method of claim 23 further comprising a fifth stored parameter, wherein the fifth parameter is used to program a bias current into a battery temperature sensor.

25. The method of claim 1 wherein the constant current comprises a first constant precharge current, and the first constant precharge current is set by a first charging parameter stored as a plurality of digital bits.

26. The method of claim 25 wherein the constant current further comprises a second constant current greater then the first constant precharge current, and the second constant current is set by a second charging parameters stored as a plurality of digital bits.

27. The method of claim 26 further comprising a second threshold for selecting between the first constant precharge current and the second constant current, wherein the second threshold is set by a third charging parameter stored as a plurality of digital bits.

28. The method of claim 1 wherein the second parameter corresponding to the constant voltage is stored as a plurality of digital bits.

29. The method of claim 1 wherein the plurality of charging parameters are each stored as a plurality digital bits, and each charging parameter is separately programmable.

30. The method of claim 29 wherein the digital bits corresponding to the plurality of charging parameters are converted to an analog parameter.

31. The method of claim 30 wherein the analog parameter is an analog voltage or current.

32. The method of claim 29 wherein the digital bits are converted to an analog parameter using a digital-to-analog converter.

33. The method of claim 1 wherein the data storage elements are programmed using a digital bus.

34. The method of claim 33 wherein the digital bus comprises a serial bus.

35. The method of claim 33 wherein the digital bus comprises a parallel bus.

36. The method of claim 33 wherein said battery comprises a lithium ion battery, a nickel metal hydride battery or a nickel cadmium battery.

37. The method of claim 1 wherein the charging parameters change a constant precharge current, a precharge threshold, a constant charge current greater than the constant precharge current, a float voltage, a constant current-to-constant voltage threshold, a termination current threshold, a precharge timeout, a fast charge timeout, an over-temperature limit, an under-temperature limit, a negative temperature coefficient thermistor bias current, or a switching regulator frequency across a range of values.

38. A programmable battery charger comprising:
a regulator having a first input to receive a first power source, a first output to provide a regulated output to at least one battery, and a control input;
a constant current controller having a first input coupled to a first programmable data storage element, a feedback input coupled to at least one current sense input, and an output coupled to the control input of the regulator, wherein the first programmable data storage element configures the constant current controller to supply a first programmed constant current to said battery if a voltage on said battery is below a first threshold; and
a constant voltage controller having a first input coupled to a second programmable data storage element, a second input coupled to at least one voltage sense input, and an output coupled to the control input of the regulator, wherein the second programmable data storage element configures the constant voltage controller to generate a first programmed constant voltage to said battery if the voltage on said battery is above the first threshold, wherein the programmed constant voltage is variable across a range of values.

39. The battery charger of claim 38 wherein said range of voltage values includes at least a highest value, a lowest value, and a plurality of intermediate values between the highest and lowest values, and wherein said constant voltage is programmed to the highest value, the lowest value, or any intermediate value by the second programmable data storage element.

40. The battery charger of claim 38 further comprising a third programmable data storage element coupled to the constant current controller, wherein the third data storage element configures the constant current controller to supply a second programmed precharge current to said battery if a voltage on said battery is below second precharge threshold, and wherein the precharge current is less than the first programmed constant current.

41. The battery charger of claim 40 further comprising a fourth programmable data storage element coupled to the constant current controller, wherein the fourth programmable data storage element sets the second precharge threshold.

42. The battery charger of claim 41 further comprising a multiplexer having a first input coupled to the first programmable data storage element, a second input coupled to the third programmable data storage element, a control input coupled to the fourth programmable data storage element, and an output coupled to the constant current controller.

43. The battery charger of claim 42 further comprising a comparator having a first input coupled to a reference voltage, a second input coupled to the fourth programmable data storage element, and an output coupled to the control input of the multiplexer.

44. The battery charger of claim 38 further comprising a digital-to-analog converter having a first input coupled to the first programmable data storage element and an analog output coupled to the constant current controller.

45. The battery charger of claim 40 further comprising a digital-to-analog converter having a first input coupled to the first programmable data storage element or the third programmable data storage element, and an analog output coupled to the constant current controller.

46. The battery charger of claim 38 further comprising a digital-to-analog converter having a first input coupled to the second programmable data storage element and an analog output coupled to the constant voltage controller.

47. The battery charger of claim 38 further comprising a third programmable data storage element coupled to a shutdown circuit, wherein the third programmable data storage element is used to terminate battery charging if a current into said battery is below a programmed termination current threshold.

48. The battery charger of claim 47 further comprising a digital-to-analog converter having a first input coupled to the third programmable data storage element and an analog output coupled to the shutdown circuit.

49. The battery charger of claim 47 further comprising a comparator having a first input coupled to at least one current sense terminal, a second input coupled to the third programmable data storage element, and an output coupled to the shutdown circuit.

50. The battery charger of claim 38 further comprising a third programmable data storage element and a fourth programmable data storage element, wherein the third programmable data storage element is used to program an over-temperature limit and the fourth programmable data storage element is used to program an under-temperature limit, and wherein if the temperature of the battery is above the over-temperature limit or below the under-temperature limit, then charging is suspended.

51. The battery charger of claim 50 further comprising a fifth programmable data storage element, wherein the fifth programmable data storage element is used to program a bias current into a battery temperature sensor.

52. The battery charger of claim 38 further comprising a third programmable data storage element, wherein the regulator is a switching regulator, and wherein the third programmable data storage element is used to program the switching frequency of the switching regulator.

53. The battery charger of claim 38 wherein a plurality of programmable data storage elements store a corresponding plurality of charging parameters, wherein the charging parameters change a constant precharge current, a precharge threshold, a constant charge current greater than the constant precharge current, a float voltage, a constant current-to-constant voltage threshold, a termination current threshold, a precharge timeout, a fast charge timeout, an over-temperature limit, an under-temperature limit, a negative temperature coefficient thermistor bias current, or a switching regulator frequency across a range of values.

54. The battery charger of claim 38 further comprising a controller coupled to the first and second programmable data storage elements to reprogram the first and second programmable data storage elements.

55. The battery charger of claim 38 further comprising a system processor coupled to the first and second programmable data storage elements, wherein the system processor includes a software algorithm for controlling reprogramming of the first and second programmable data storage elements.

* * * * *